US011873856B2

(12) United States Patent
Rice

(10) Patent No.: US 11,873,856 B2
(45) Date of Patent: Jan. 16, 2024

(54) PRECISION TORQUE CONTROL POSITIVE LOCK NUT

(71) Applicant: Sky Climber Fasteners LLC, Delaware, OH (US)

(72) Inventor: Donald Wayne Rice, Ripley, NY (US)

(73) Assignee: BPC LG 2, LLC, Charlotte, NC (US)

( * ) Notice: Subject to any disclaimer, the term of this patent is extended or adjusted under 35 U.S.C. 154(b) by 336 days.

(21) Appl. No.: 17/395,074

(22) Filed: Aug. 5, 2021

(65) Prior Publication Data
US 2021/0364032 A1 Nov. 25, 2021

Related U.S. Application Data

(63) Continuation-in-part of application No. 15/906,549, filed on Feb. 27, 2018, now Pat. No. 11,137,015.

(51) Int. Cl.
*F16B 37/12* (2006.01)
*F16B 39/284* (2006.01)

(52) U.S. Cl.
CPC ................ *F16B 39/284* (2013.01)

(58) Field of Classification Search
CPC .............. F16B 37/12; F16B 39/284
USPC ............................. 411/178, 438
See application file for complete search history.

(56) References Cited

U.S. PATENT DOCUMENTS

| 1,787,114 | A |   | 12/1930 | Lelean et al. |   |
|---|---|---|---|---|---|
| 2,152,681 | A | * | 4/1939 | Caminez | F16B 37/12 |
|   |   |   |   |   | 123/195 P |
| 2,262,450 | A | * | 11/1941 | Camines | F16B 39/32 |
|   |   |   |   |   | 411/282 |
| 2,365,433 | A |   | 12/1944 | Polizzi |   |
| 2,688,355 | A | * | 9/1954 | Forster | F16B 37/12 |
|   |   |   |   |   | 411/289 |
| 2,825,379 | A |   | 3/1958 | Becker |   |
| 2,874,741 | A | * | 2/1959 | Brancato | F16B 37/12 |
|   |   |   |   |   | 411/262 |
| 3,031,004 | A | * | 4/1962 | Brancato | B21F 3/04 |
|   |   |   |   |   | 72/131 |
| 3,129,742 | A |   | 4/1964 | Faroni et al. |   |
| 3,912,503 | A | * | 10/1975 | Schumacher | C22C 38/001 |
|   |   |   |   |   | 420/59 |
| 5,032,047 | A |   | 7/1991 | Theakston |   |
| 5,080,544 | A |   | 1/1992 | Bruyere |   |
| 5,360,303 | A |   | 11/1994 | Behrens et al. |   |
| 6,494,659 | B1 |   | 12/2002 | Lutkus et al. |   |
| 6,726,422 | B2 |   | 4/2004 | Giannakakos |   |
| 8,998,548 | B2 |   | 4/2015 | Kousens |   |

(Continued)

FOREIGN PATENT DOCUMENTS

GB 968448 A 9/1964

OTHER PUBLICATIONS

International Search Report and Written Opinion of the International Searching Authority, PCT/US22/39264, dated Oct. 28, 2022, 10 pages.

(Continued)

*Primary Examiner* — Flemming Saether
(74) *Attorney, Agent, or Firm* — Dawsey Co., LPA; David J. Dawsey

(57) ABSTRACT

A torque control fastener system having a fastener nut, a helical wire insert, and a shaft, where the nut and helical wire insert have unique hardness and coefficient of thermal expansion relationships that produce improved performance.

20 Claims, 28 Drawing Sheets

(56) References Cited

U.S. PATENT DOCUMENTS

| | | | |
|---|---|---|---|
| 9,845,822 B2 | 12/2017 | Pailhories | |
| 2004/0120789 A1 | 6/2004 | Masuda | |
| 2009/0200418 A1 | 8/2009 | Beaufort | |
| 2010/0221087 A1* | 9/2010 | Gillis | F16B 37/12 |
| | | | 72/371 |
| 2012/0063863 A1 | 3/2012 | Campu | |
| 2016/0076576 A1 | 3/2016 | Stahl et al. | |
| 2018/0009543 A1 | 1/2018 | Journade et al. | |
| 2020/0408241 A1 | 12/2020 | Rice | |
| 2021/0071705 A1 | 3/2021 | Rice | |
| 2021/0231160 A1 | 7/2021 | Rice | |

OTHER PUBLICATIONS

Helical Wire Inc., Products Catalog, Jul. 26, 2015, <https://web.archive.org/web/20150726110629/http://helicalwire.com/wp-content/uploads/2014/10/ Helical-Wire-Products-Catalog.pdf> (year 2015).

NASM 8846, Revision 1, Insert, Screw-Thread, Helical Coil, National Aerospace Standard, Aerospace Industries Association, 2011 (Year: 2011).

Reasons to use Helicoil, Eureka Magazine, Apr. 7, 2016, <https://web.archive.org/web/20160407092058/https://www.eurekamagazine.co.uk/design-engineering-products/reasons-to-use-helicoil/115996/> (Year: 2016).

The Evaluation of Some Threaded Inserts, AFML-TR-78-107, Air Force Materials Laboratory, Oct. 1979, Table 58 ( p. 98) (Year: 1979).

NAS 577, Revision 16, Barrel Nut, National Aerospace Standard, Aerospace Industries Association, 2011 (Year: 2011).

Wire Thread Inserts, Power Coil (Borda), Mar. 2, 2016, <https://web.archive.org/web/20160302203437/https://www.powercoil.com.au/category/wire-thread-inserts/> (Year: 2016).

* cited by examiner

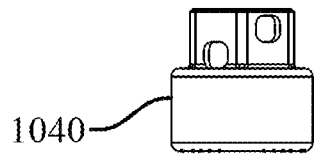
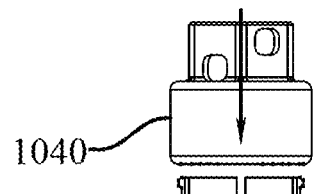
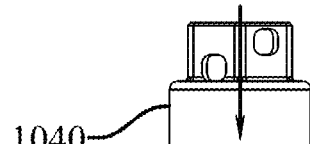
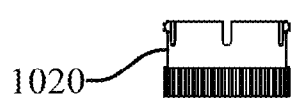
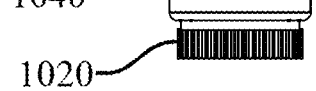
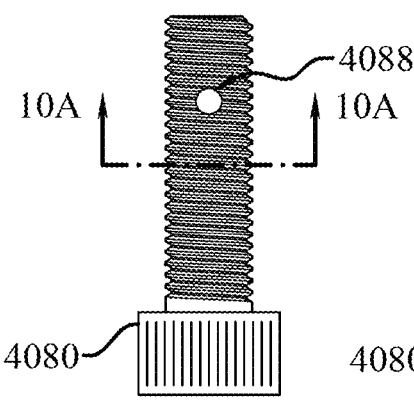
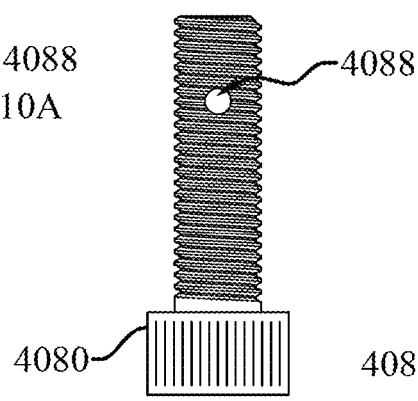
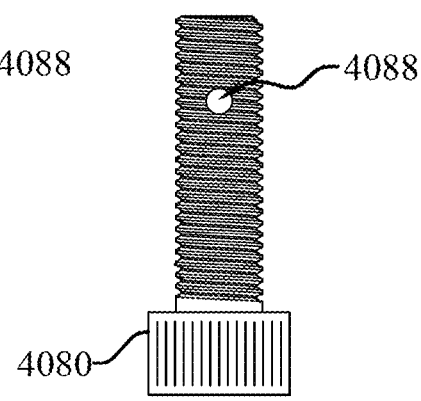
*Fig. 8A*  *Fig. 8B*  *Fig. 8C*
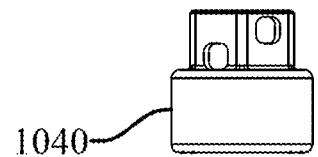
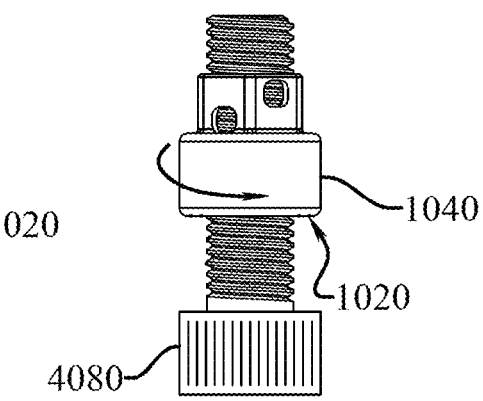
*Fig. 8D*  *Fig. 8E*  *Fig. 8F*

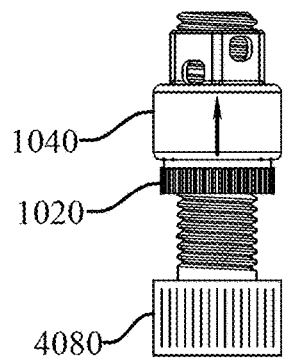 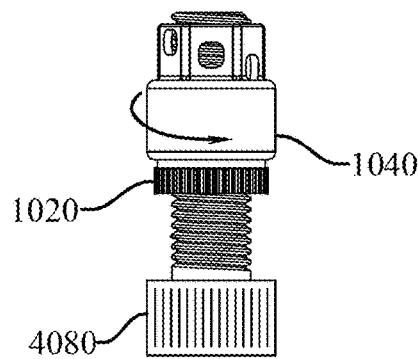 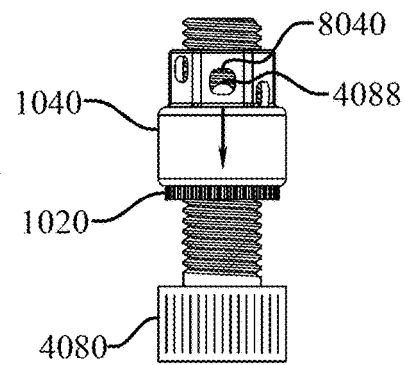
Fig. 9A    Fig. 9B    Fig. 9C
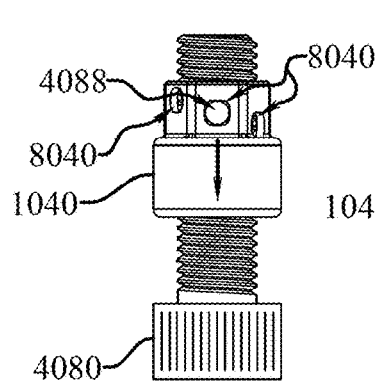 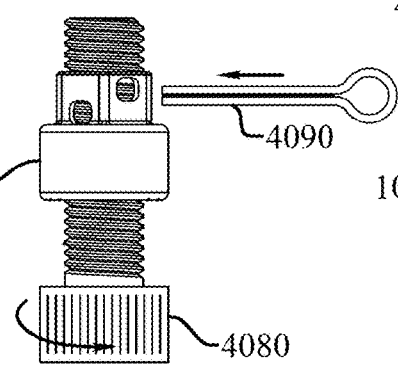 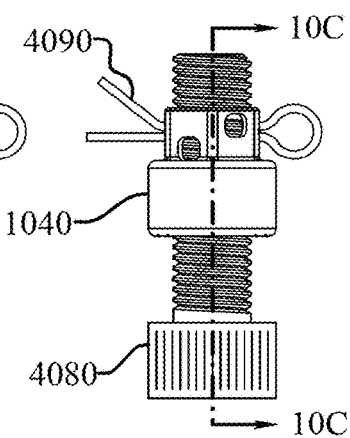
Fig. 9D    Fig. 9E    Fig. 9F

US 11,873,856 B2

PRECISION TORQUE CONTROL POSITIVE LOCK NUT

CROSS-REFERENCE TO RELATED APPLICATIONS

This application is a continuation-in-part application of U.S. patent application Ser. No. 15/906,549 filed Feb. 27, 2018, which claims priority to U. S. patent application Ser. No. 15/595,620, filed May 15,2017, to U. S. Provisional Patent Application Ser. No. 62/553,190, filed Sep. 1, 2017, and to U. S. Provisional Patent Application Ser. No. 62/414, 423, filed Feb. 28, 2017, the disclosures of which are hereby incorporated by reference.

STATEMENT REGARDING FEDERAL GRANTS

Not Applicable.

BACKGROUND OF THE INVENTION

The present disclosure relates to a positive torque locked nut and fastener system with a longitudinally serrated lock nut and removable cap that is used as part of a fastener system to lock a fastener in place. In a preferred embodiment, the locking feature fastener system is utilized in vehicles, such as in aircraft. In an alternative embodiment a helical wire insert is used in conjunction with a dissimilar material to form the locking fastener, such as a polymer fastener body with a steel alloy helical thread system.

Locking fasteners are widely used in attaching equipment to an aircraft fuselage, and for other installations in vehicles, such as cars, agricultural equipment, construction equipment, railroad equipment and the like. In particular, aircraft jet engines are often attached to the airframe with barrel nuts that include a locking feature. Rotating shafts are commonly secured with a positive locking fastener, such as with a cotter pin. In addition, the same or similar fasteners are used in a variety of situations, such as industrial equipment, farm equipment and other equipment where vibration and motion control is required.

Castellated nuts and a compatible cross bore on a threaded shaft have been commonly used for some time to lock a shaft in position by insertion of a pin, (such as a cotter pin), a wire insert, or both. For instance, alternatively, a nut can have a pressed steel castellated cap placed over the nut, and the crennelations in the cap are aligned with a cross bore in the shaft.

Prevailing torque locking fasteners are available that provide for a prevailing torque lock through use of a disk of resilient material. For instance, Vespel (™) inserts are made from a polymide material and are often used with locking or self-locking fasteners. Currently available fastener systems are generally less than fully acceptable because the available locking inserts are expensive and installation of a disk for a locking insert, such as a Vespel (™) insert, is often difficult. Commonly Dupont Vespel SP polymide components are machined or cut into a disk shape and then inserted as a collar around a fastener nut. An additional difficulty in using such inserts is that the bolt fasteners must be driven into the insert to maintain the specified torque tolerance even when used in an environment that imposes a wide range of temperatures and vibration patterns.

Locking fasteners which use inserts such as resilient inserts formed of Vespel (™) have many limitations. Importantly, such inserts are expensive, as the plastic material must be approved by OEM users and the proprietary material in Vespel (™) cannot be substituted by unapproved alternatives from third parties. The use of resilient inserts also has many issues such as a) the inserts are easily-damaged during installation b) the inability to reuse resilient inserts for reinstallation of components, and c) the limitation to the shape of fasteners when using a resilient collar. These current systems are generally limited, and could be substantially improved with an alternative substitute to a resilient insert locking fastener. Another disadvantage of existing systems is the limited number of cycles of insertion and removal that are within specified limits. Furthermore, there is an undesired inconsistency between locking torque values between the early cycles of use, and when the fastener is finally replaced.

Other previous attempts in the aircraft industry to improve on locking fasteners have resulted in a variety of fasteners, each of which have certain limitations. For example, U.S. Pat. No. 5,127,782 issued Jul. 7, 1992 discloses a fastener system as a self locking castellated nut. For instance, the Shur-Lok "Sta-Lok" (T) system is approved for use in aircraft such as helicopters, and utilizes a series of small serrations to hold a fastener nut in place after being torqued to a give specification. For purposes of reliability and safety a positive locking mechanism is considered important, and in some situations essential.

An improved fastener system is desired by manufacturers and retrofitters to reduce the cost of current fasteners, and it is also desirable to enable labor savings along with improved assembly processes, and improved maintainability, reparability, overhauling, fastener reliability and strength.

BRIEF DESCRIPTION OF THE DRAWINGS

For a fuller understanding of the nature and advantages of the present invention, reference should be had to the following detailed description taken in connection with the accompanying drawings, in which:

FIG. 8A shows a side elevation assembly view of a fastener;

FIG. 8B shows a side elevation assembly view of a fastener;

FIG. 8C shows a side elevation assembly view of a fastener;

FIG. 8D shows a side elevation assembly view of a fastener;

FIG. 8E shows a side elevation assembly view of a fastener;

FIG. 8F shows a side elevation assembly view of a fastener;

FIG. 9A shows a side elevation assembly view of a fastener;

FIG. 9B shows a side elevation assembly view of a fastener;

FIG. 9C shows a side elevation assembly view of a fastener;

FIG. 9D shows a side elevation assembly view of a fastener;

FIG. 9E shows a side elevation assembly view of a fastener;

FIG. 9F shows a side elevation assembly view of a fastener;

SUMMARY OF THE INVENTION

A torque control fastener system having a fastener nut, a helical wire insert, and a shaft, where the nut and helical wire insert have unique hardness and coefficient of thermal expansion relationships that produce improved performance.

DETAILED DESCRIPTION OF THE INVENTION

Disclosed herein is a new apparatus and associated method for securing equipment to an underlying structural support. In particular, disclosed is a locking fastener useful for attaching components in vehicles, engines, and the like to structural members, where attachments may be subject to vibrational loosening.

As disclosed herein such fastener typically is configured to accept a male fastener, and provide for a desired set of torque tolerances including locking, unlocking, and during installation or removal.

Figure 1A:
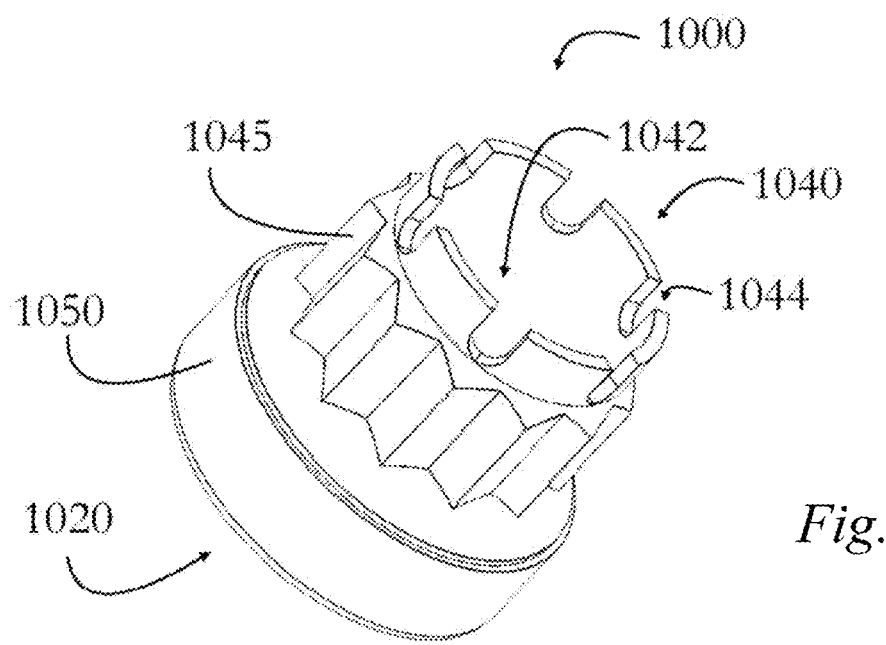
FIG. 1A shows an overhead assembled perspective view of a torque control locking fastener.
Figure 1B:
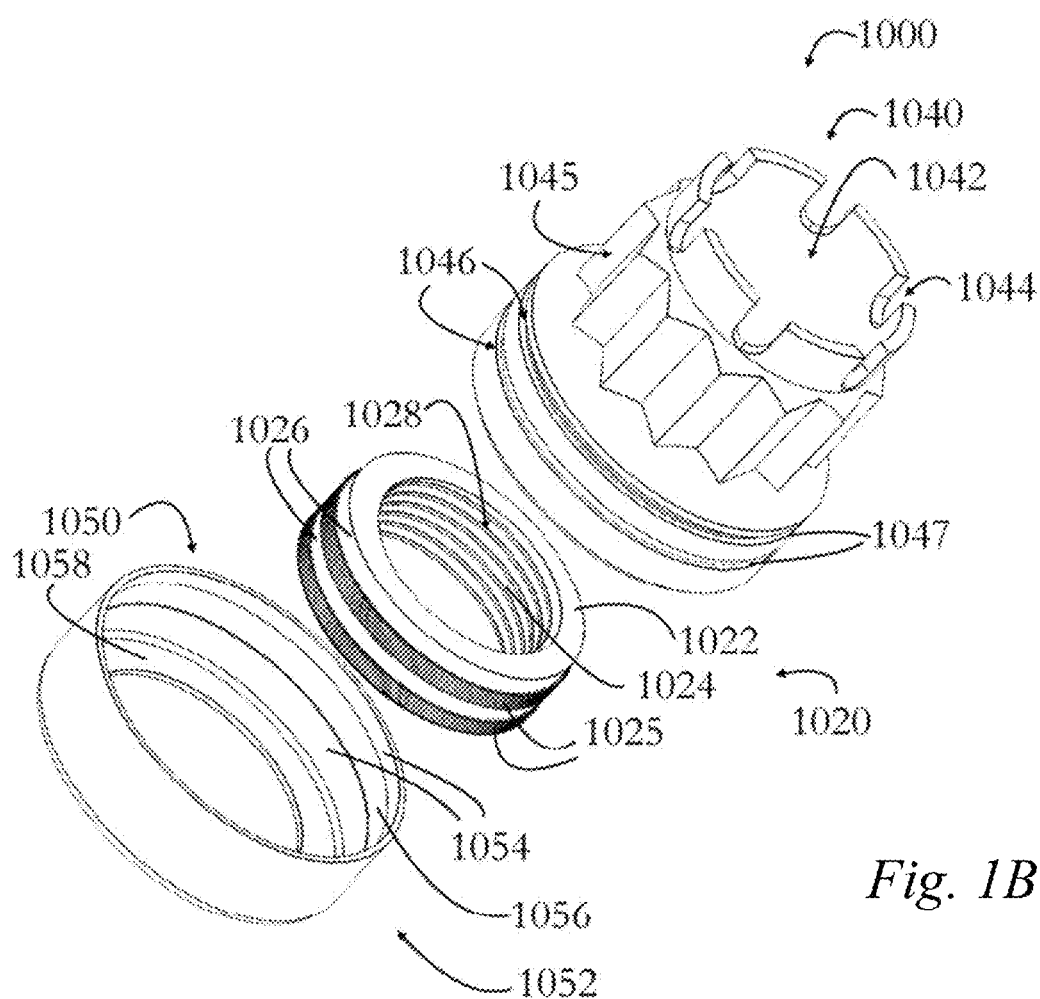
FIG. 1B shows an exploded view of a torque control locking fastener.

FIGS. 1A, 1B, and 8A-8F show an assembly and associated views of a locking fastener 1000 that provides an integrated retaining cap and allows for precise control of the applied torque and locking in a preferred position. Such a fastener 1000 can be provided with or without an optional helical thread insert (HTI) 1030, seen in FIG. 3C, that can provide for improved thread characteristics or additionally, a prevailing torque feature. The fastener 1000 shown in FIG. 1B is embodied as a serrated nut 1020 with integrated cap 1040. Fastener 1000 is essentially comprised of a nut body 1022, of nut 1020, and a nut cap 1040. Fastener 1000 may have an externally circular shape with externally disposed longitudinal serrations 1025 on the exterior perimeter of the nut body 1022 (hidden in FIG. 1A). A nut cap 1040 is provided with internally disposed serrations compatible with the external perimeter serrations of the nut body, such as the serrations 4010 shown in FIG. 4.

As shown in FIG. 1A nut cap 1040 may nest inside a cap retainer 1050. The illustrated nut cap 1040 is provided with a series of crenellations, or notches, 1044 which allow for a retainer such as a pin or wire, 4090 seen in FIG. 4, to pass through a cross bore 4088 in an inserted shaft 4080 and lock the nut 1020 in position relative to the shaft 4080. The nut cap 1040 provides a wrenching interface 1045, shown in the embodiment in FIG. 1A as a twelve point nut body. Those skilled in the art will recognize that other nut shapes are applicable to the disclosure. The nut cap 1040 is formed with a shaft bore, 1040, a portion of which may be formed as a thread bore. The thread bore may be tapped to conform to the desired thread pattern. Threads can be directly cut in a desired thread form or alternatively formed to fit typically available standard thread inserts, for example, STI threads.

FIG. 1B shows an exploded perspective view of an embodiment of the fastener 1000. Nut 1020 has a generally cylindrical nut body 1022, with an internal bore with threads 1024. Threads 1024 are shown as integrally formed, although STI thread or the like can be provided to allow installation of a helical thread insert 1030, seen in FIG. 3C. The exterior surface of the nut body 1022 may be formed with a series concentric serration 1026, shown as two rings of serrations in FIG. 1B, and separated by clear rings 1025. In one embodiment the nut cap 1040 has compatible serrations on the internal surface, so that the internal serrations of nut cap 1040 engage with the external serrations of nut body 1020.

In an embodiment, as seen in FIG. 1B, the nut cap 1040 has concentric channels 1047 that hold rings 1046. A retainer cup 1050 may have compatible rings that allow for the nut cap 1040 to be rotated relative the nut body 1020.

Figure 3A:
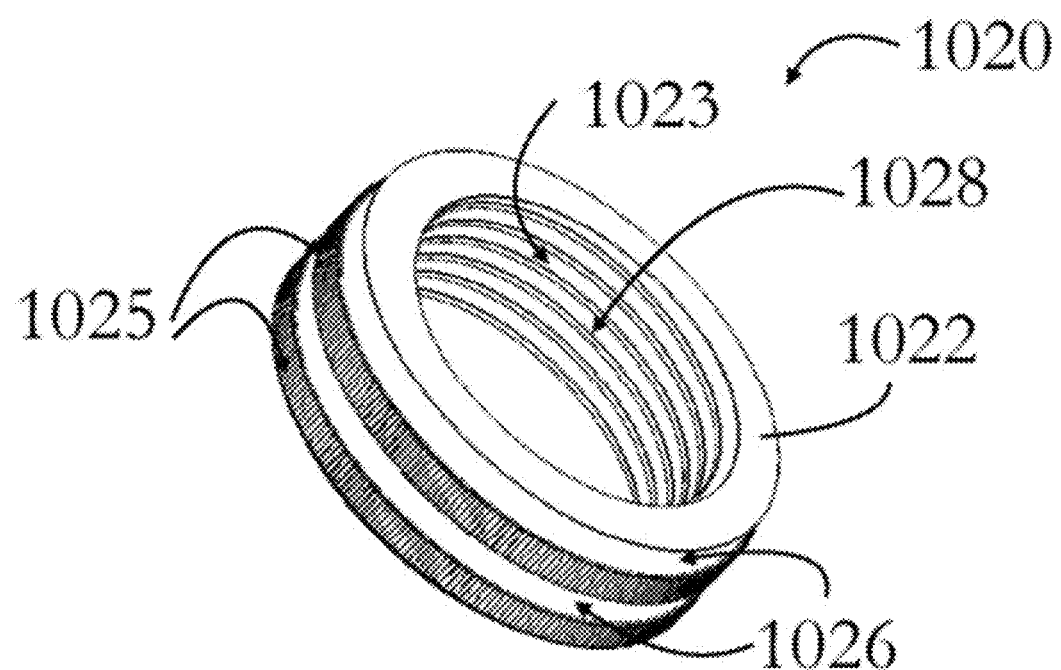
FIG. 3A shows a perspective view of a serrated nut body for use with the fastener system.
Figure 3B:
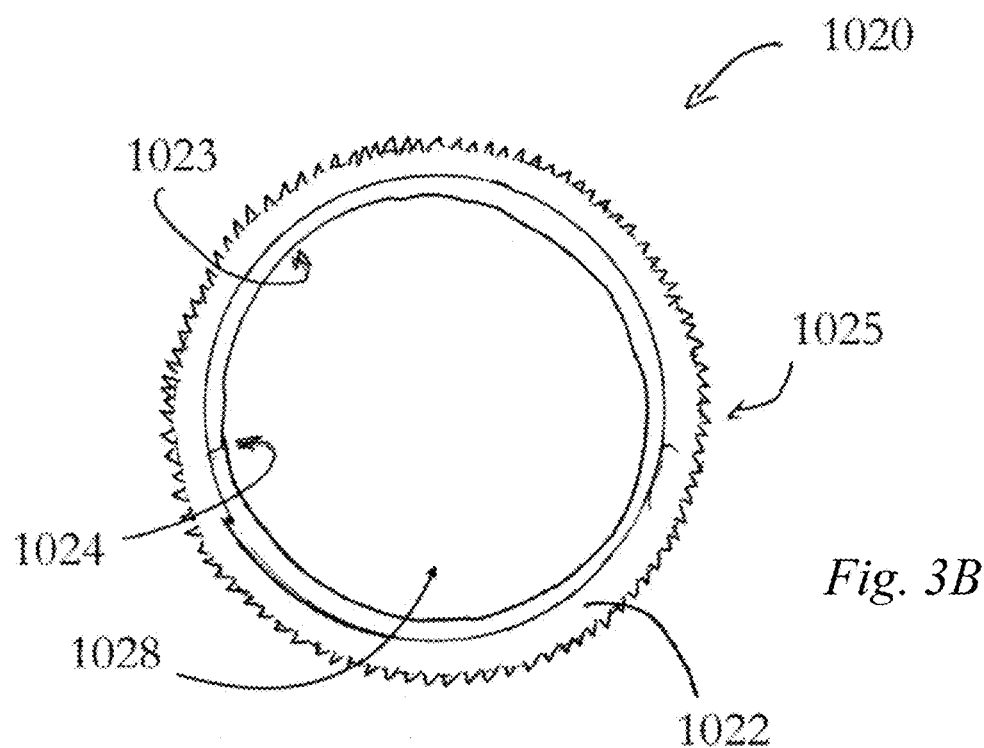
FIG. 3B shows a top plan view of a serrated nut body for use with the fastener system.
Figure 3C:
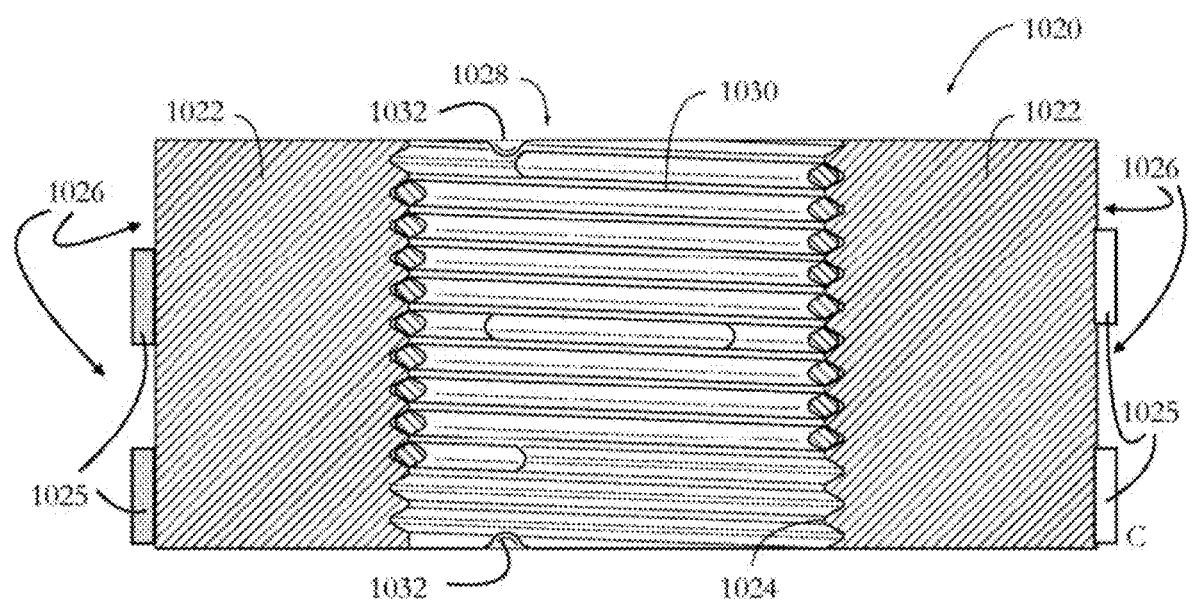
FIG. 3C shows a cross-sectional view of a serrated nut body for use with the fastener system.

In the embodiment of FIG. 3C, as a bolt is inserted into the assembled locking fastener, such as fastener 1000, rotation of the bolt engages helical insert 1030, and expands the helical insert 1030 to bear against the inner surface of the thread bore body. As the bolt, aka shaft 4080 of FIG. 4, advances into the helical insert 1030, additional segments of the helical insert 1030 are expanded and bear against the thread bore body. In one embodiment, the bolt is advanced entirely through the helical insert 1030 and thread bore body, and is finally torqued to a specified torque. In such case, the characteristics of the helical insert 1030 will serve to retain the bolt in position and resist any backing-out of the bolt to a reverse torque specification determinable according to the characteristics of the helical insert 1030. Properly installed, the helical insert 1030 will bear against both the bolt and the thread bore body, retaining the inserted bolt.

In an alternative embodiment, the bolt is inserted only a portion of the depth of the helical insert 1030, and the portion of the helical insert 1030 that is bearing against the bolt and the thread bore body will retain the bolt to a determinable reversing torque. A variety of such specifications and applications are provided by the manufacturer of helical wire inserts, such as from Kato Fastening Systems, Inc.

described in regards to FIGS. 1A and 1B, castellated nuts and bearing nuts (for instance) may be provided with a pressed steel nut cap 1040 bearing castellations, utilized the "serration" in the form of the nut exterior perimeter, typically with six points, or possible also eight or twelve points. The nut cap 1040 may have six, eight, ten, or twelve notches. As described herein, the term serration refers to a uniform series of notches, indentation or tooth pockets, so that rotation of a nut 1020 and nut cap 1040 allows for continual matching of compatible serrations, i.e. teeth and notches, when in an engaged position. As shown in regards to FIG. 1B, the distance between successive teeth around the circumferential perimeter of a nut 1020 is preferably about 1 mm, or about 2 mm. It is preferred that successive teeth be spaced less than about 5 mm apart.

By providing a series of compatible teeth and notches, it is thus not necessary to deviate from a preferred torque on the installed nut 1020. The ease of the rotation of the nut cap 1040 to align a cross bore 4088, seen in FIG. 4, in a shaft 4080 with a castellation, such as 1044 and 4040, in the nut cap 1040 allows for the preferred torque to be applied to the nut 1020 during installation, and then no backing off of the nut 1020 is necessary to install the lock (whether key, cotter pin, or wire) though the nut cap 1040 and the shaft cross bore 4088.

A further improvement of the fastener 1000 is to install a helical thread insert 1030, seen in detail in FIGS. 3C and 28-30, in the thread bore 1024 of the nut 1020. Such a helical thread insert (HTI) 1030 can be either a locking (prevailing torque) or free running insert. Helical inserts, such as Kato brand "CoilThread" (™) inserts, have been used for some time in industry for applications that substantially differ from those disclosed, including, for instance, as a means to repair damaged threads. KATO CoilThread inserts are available in a variety of wound thread sizes including Unified Coarse (UNC), Unified Fine (UNF) and Metric thread sizes. As such the preceding are only some of the variety of helical coil inserts. When helical coil inserts are assembled in "STI" (Standard Thread Insert) tapped holes, helical coil inserts form standardized Unified Coarse (UC) or Unified Fine (UF) threads that conform to National Bureau of Standards Handbook H-28, and meet screw thread standards according to U.S. Federal classification. Helical coil inserts can also be produced that fit a variety of thread standards, such as for instance, will also accommodate UNJ, MIL-S-8879, and male threaded fasteners. Further examples are shown in the 2015 CoilThread Inserts and Tools product catalog of Kato Fastening Systems, Inc. of Newport New, Va. In one embodiment the helical thread insert 1030 undergoes a diameter reduction during installation. The outward spring-like force of the helical thread insert 1030 "locks" the insert into place. Each 360 degree coil of the helical thread insert 1030 can flex independently to contact the greatest amount of thread of the nut 1020 thereby improving both static and dynamic load bearing capabilities of the nut 1020.

While in a conventional nut assembly the tensile load is spread over one or two threads, with the helical thread insert 1030 each engaged coil acts independently to spread the tensile load out over all of the engaged threads. The helical thread insert 1030 provides an increase in the bearing area and an increase in the ultimate tensile strength of the fastener. In fact, failure testing of a fastener 1000 having a nut 1020 with a 180 ksi tensile rating and utilizing a helical thread insert 1030 in combination with a shaft 4080 having a 220 ksi tensile rating, and a second shaft 4080 having a 260 ksi tensile rating, resulted in failures of the shaft 4080 in both instances, despite it having the higher strength. Further, incorporation of the helical thread insert 1030 produces a reusable prevailing torque fastener. In fact, in one embodiment a 50 cycle test of the locking torque and breakaway torque demonstrated that the breakaway torque remained above 18 in-lbs for all 50 cycles. In fact, in another embodiment the breakaway torque varied by less than 50% from the first cycle to the $50^{th}$ cycle, and less than 45% in another embodiment, and less than 40% in still a further embodiment. In one embodiment the breakaway torque of all cycles was within 20 in-lbs of the initial breakaway torque, and within 17.5 in-lbs in another embodiment, and within 15 in-lbs in still a further embodiment. The fastener 1000 incorporating the helical thread insert 1030 far exceeded the 30,000 cycle vibration test of NASM 1312-7 and the 800° F. soak torque test of NASM 25027. Additionally, testing of a fastener 1000 incorporating the helical thread insert 1030 in a ¼ aluminum nut 1020 produced a tensile strength exceeding the axial tensile requirement of alloy steel by 23% per NASM 25027 Table 1, at less than ½ of the weight of a comparably sized steel nut, 1.48 grams versus 3.76 grams, while still exceeding the 30,000 cycle vibration test of NASM 1312-7. In one embodiment the nut has a nut mass of no more than 3 grams, and no more than 2.5 grams, 2.0 grams, and 1.5 grams in further embodiment. In another embodiment the helical thread insert 1030 has an insert mass that is at least 20% of the nut mass, and at least 30%, 40%, and 50% in further embodiments. In another series of embodiments the insert mass is no more than the nut mass, and no more than 85% of the nut mass in another embodiment, and no more than 75%, 65%, and 55% in further embodiments.

As noted, testing has been performed of a nut 1020 having the helical thread insert 1030. In the test samples, a sample nut 1020 was formed of 180 KSI material bored to size and then provided with a stainless steel helical thread insert 1030. The strength to failure of the improved fastener was compared to two aircraft nut samples that are currently utilized by an aircraft manufacturer. The nut "BACN10HC" is formed of 220 KSI material, while the nut "BACN10ZC" is formed of 180 KSI material. As shown in Table I below, the tested sample fastener, formed as described in the present disclosure, exhibited an unexpectedly high force required to fail the sample nut 1020. The 180 KSI material forming the sample nut 1020, with the described helical thread insert 1030, had a failure strength that was almost indistinguishable from the BACN10HC nut formed of 220 KSI material. In addition, the locking and breakaway torque forces were not substantially reduced over 15 cycles of tightening and loosening. Thus, not only was the strength performance better, but the improved system described herein provides a fastener that can be repeatedly used without substantially decreased performance. Thus, the prototype sample 180 KSI nuts 1020 performed as well as 220 KSI material nuts of BACN10HC. The consistency of the locking torque values over 15 cycles is far superior to the typical performance of Vespel material for the friction locking by common prevailing torque material.

TABLE 1

| | BACN10HC (220 KSI) | BACN10ZC (180 KSI) | Sample Nut 1020 with Helical Thread Insert 1030 (180 KSI nut material) |
|---|---|---|---|
| Failure Load (PSI) | 37,800 | 30,700 | 37,771 (average) |
| Locking Torque (in-lbs) MIN | 150 | 150 | Cycle 1: 81.22 Cycle 15: 61.88 |
| Breakaway Torque (in-lbs) MIN | 18 | 18 | Cycle 1: 79.11 Cycle 15: 63.77 |

An additional series of testing was performed using 220 KSI bolts, aka shafts 4080, inserted into the fasteners and tested to determine the force necessary to cause the threads to fail under load. Surprisingly, the 220 KSI shaft 4080 failed before the 180 KSI sample nut 1020 with the helical thread insert 1030. Another test was performed using sample nuts 1020 made of Inconel 718 (material rated also at 180 KSI) and bolts, aka shafts 4080, rated at 260 KSI with the belief that the failure profile of the sample nuts 1020 could be determined. Surprisingly, once again the 260 KSI rated bolts, aka shafts 4080, failed before the threads in the Inconel 718 sample nut 1020. The bolt failure occurred at 265 KSI (44% higher than the Inconel 718 sample nut 1020 rating), yet unexpectedly the 180 KSI Inconel 718 sample nut 1020 with helical thread insert 1030 still did not fail. It is believed that the fastener may still be functional, if the failed bolt shaft could be removed. Thus, testing reveals a significant improvement of the tensile strength performance.

In the above described testing, the breakaway and prevailing torque tests were performed before the tensile failure tests. As expected, the torque values were very consistent; much more consistent over 15 cycles than any other form of prevailing torque fastener currently available. Nuts 1020 manufactured as described with the helical thread insert 1030 maintain a locking torque of within about 50% of the average of the first five cycles, over the last of 15 cycles in one embodiment, and within 40% and 30% in further embodiments. Similarly, nuts 1020 manufactured as described with the helical thread insert 1030 are predicted to maintain a breakaway torque of within about 50% of the average of the first five cycles, over the last of 15 cycles in one embodiment, and within 40% and 30% in further embodiments.

Figure 27A:
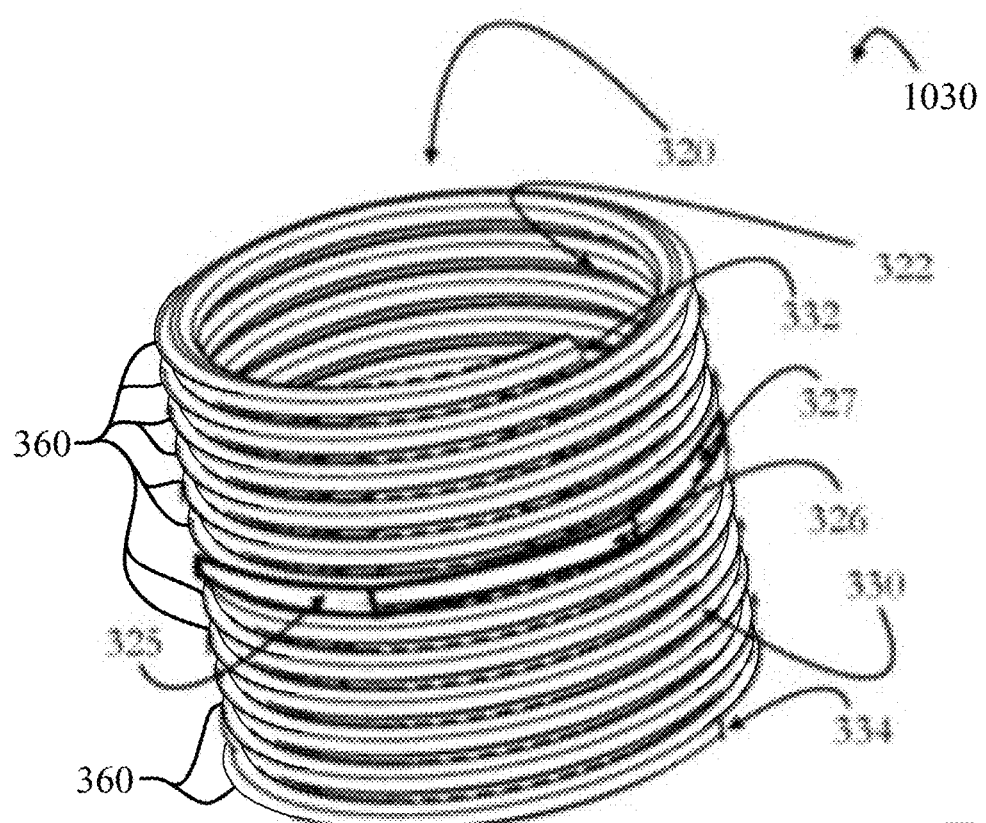
FIG. 27A shows a perspective view of a helical thread insert.
Figure 27B:
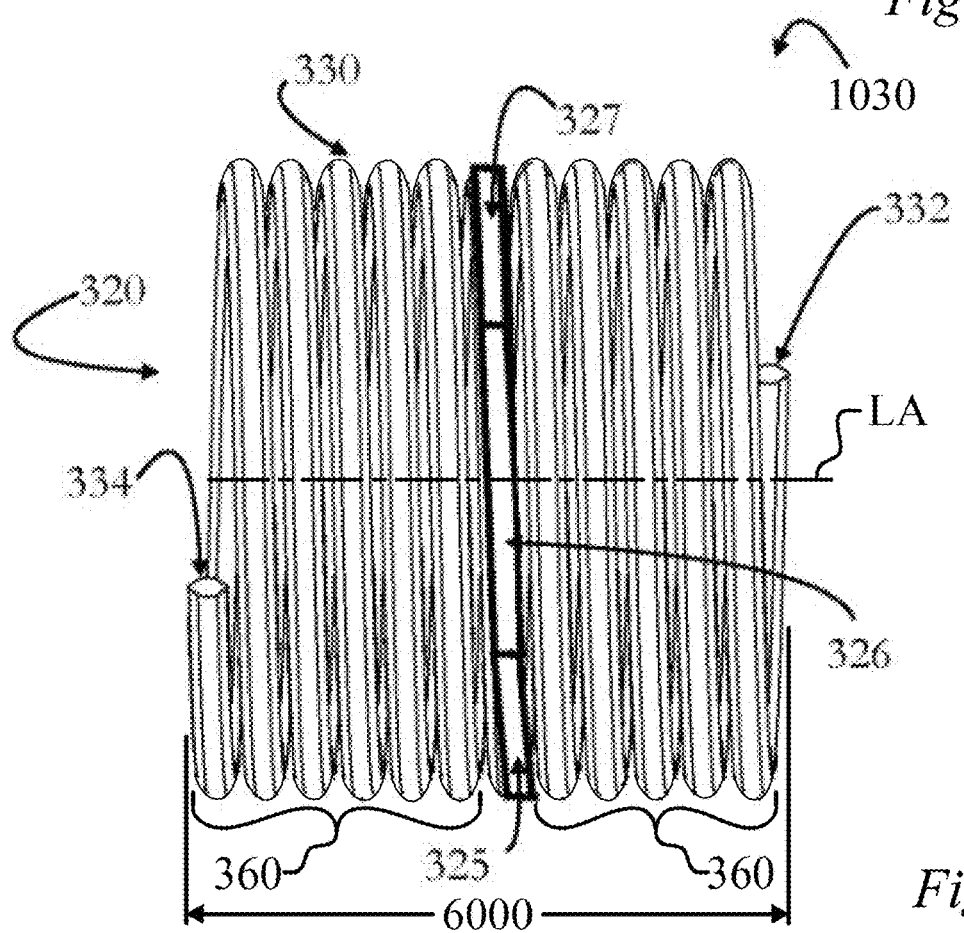
FIG. 27B shows a side elevation view of a helical thread insert.
Figure 27C:
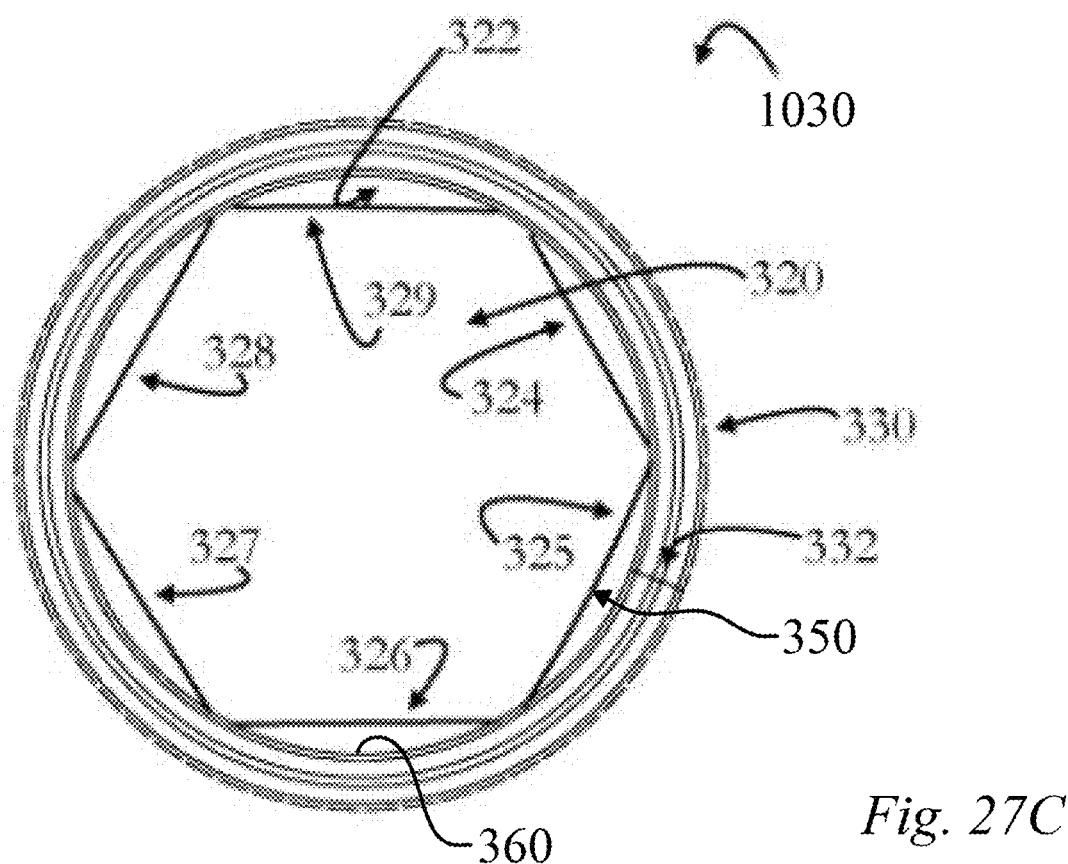
FIG. 27C shows a top plan view of a helical thread insert.
Figure 27D:
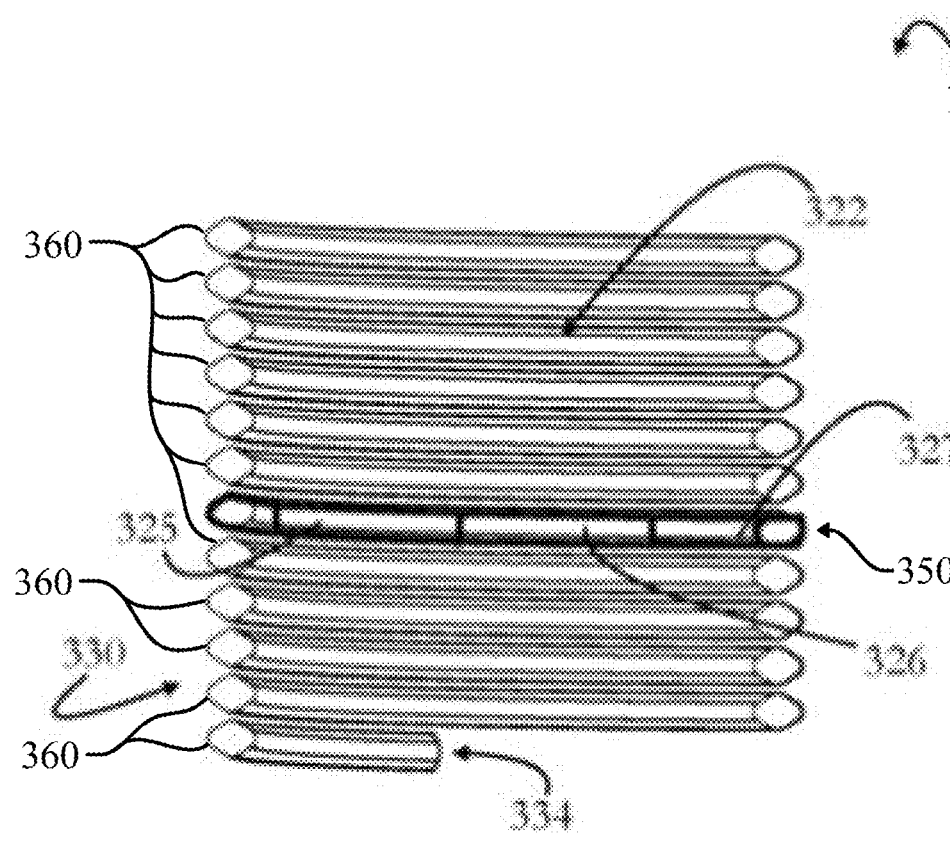
FIG. 27D shows a cross-sectional view of a helical thread insert.
Figure 28:
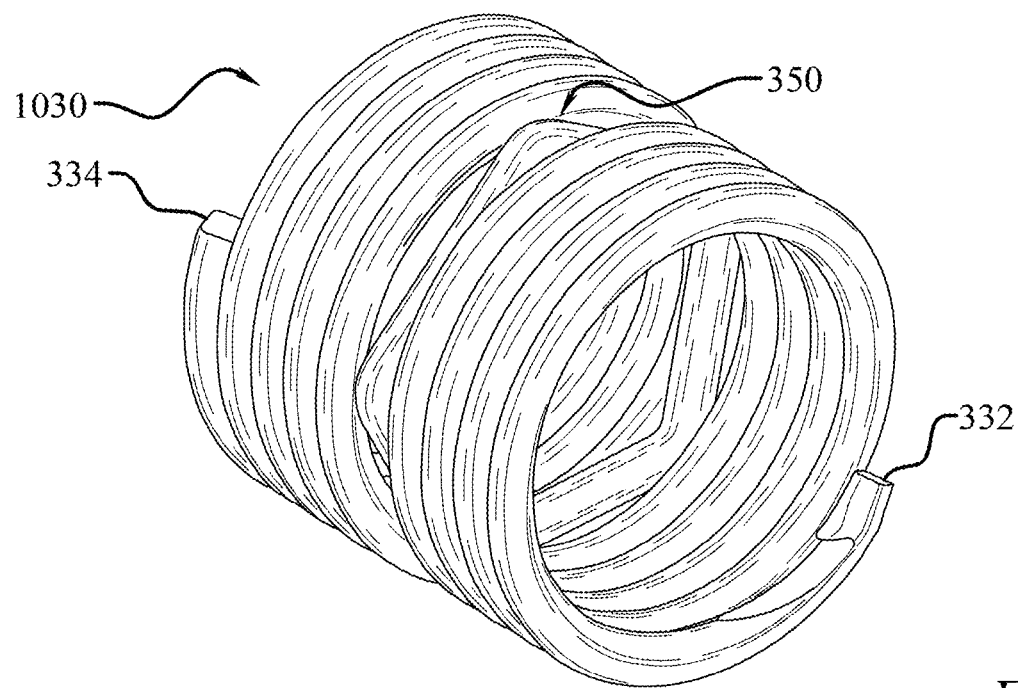
FIG. 28 shows a perspective view of a helical thread insert.
Figure 29:
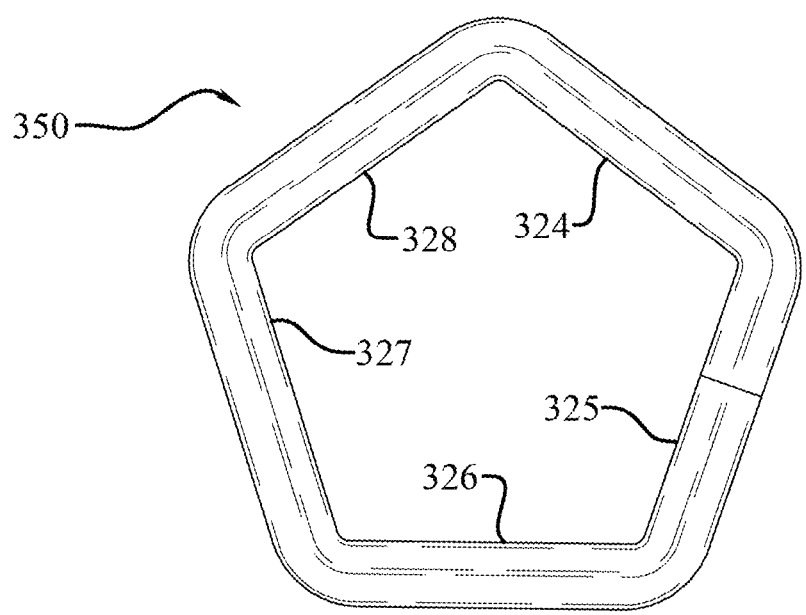
FIG. 29 shows a top plan view of a locking coil.

As seen in FIGS. 27A-30J, the helical thread insert 1030 may further include at least one non-round locking coil 350 that has a series of straight segments, seen as 324-329 in FIG. 27C. A regular coil 360, or round coil, of the helical thread insert 1030 is defined as one having a full 360 degree circumference of uniform curvature, as seen in FIGS. 27A-27D. Upon entry of the shaft 4080 the straight segments 324-329 of the locking coil 350 are flexed outwardly, creating pressure on the shaft 4080 so that contact area is increased and unit pressure is minimized. FIGS. 27A and 28 show a perspective views of such a helical thread insert 1030. Helical thread insert 1030 is formed of polygonal wire, so that the insert 1030 presents external threads 330 and an internally threaded threadbore 320 with internal threads 322, and locking coil 350 embodiments have a series of at least three faces, 324-329 (for example), which project into the final threadbore 320, with the embodiment of FIG. 27C illustrating six faces and the embodiment of FIG. 29 illustrating five faces, however the locking coil 350 may include three or more such faces, including five or more in an embodiment, six or more in another embodiment, eight or more in a further embodiment, and ten or more in still a further embodiment. Performance is diminished, and manufacturing complexity increased, when the locking coil 350 has more than twenty-four faces in one embodiment, and no more than eighteen faces in another embodiment, and no more than twelve faces in a further embodiment, and no more than eight faces in still another embodiment.

The helical thread insert 1030 has as an insert longitudinal axis LA, seen in FIG. 27B, an insert distal end 332, and an insert proximal end, which defines an insert length 6000 measured parallel to the insert longitudinal axis from the insert distal end 332 to the insert proximal end 334. Further, the nut 1020 has a nut longitudinal axis LA, seen in FIG. 30A, and has a nut threaded length 9000 measured parallel to the nut longitudinal axis from the extreme ends of the threaded portion of the nut 1020.

Figure 30A:
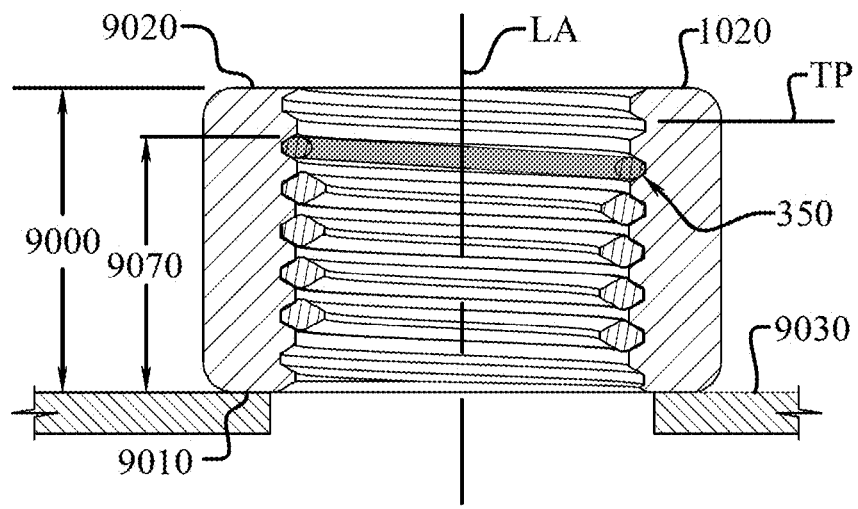
FIG. 30A shows a cross-sectional view of a helical thread insert within a nut.
Figure 30B:
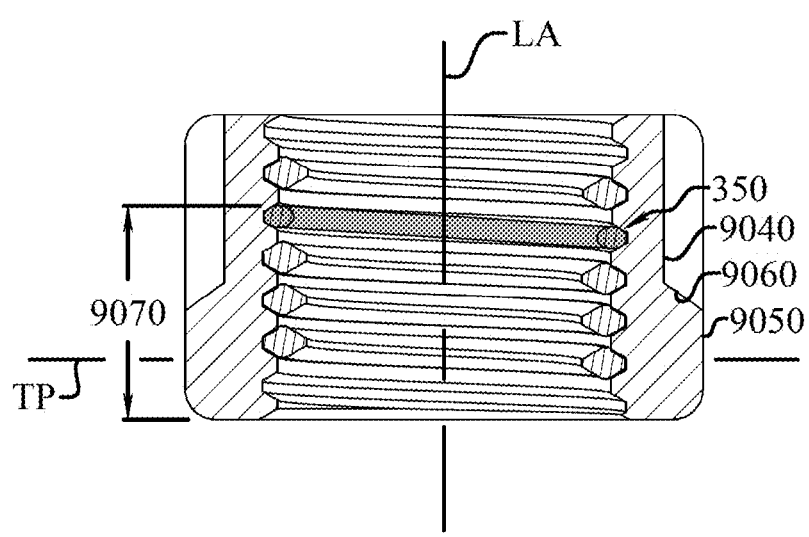
FIG. 30B shows a cross-sectional view of a helical thread insert within a nut.
Figure 30C:
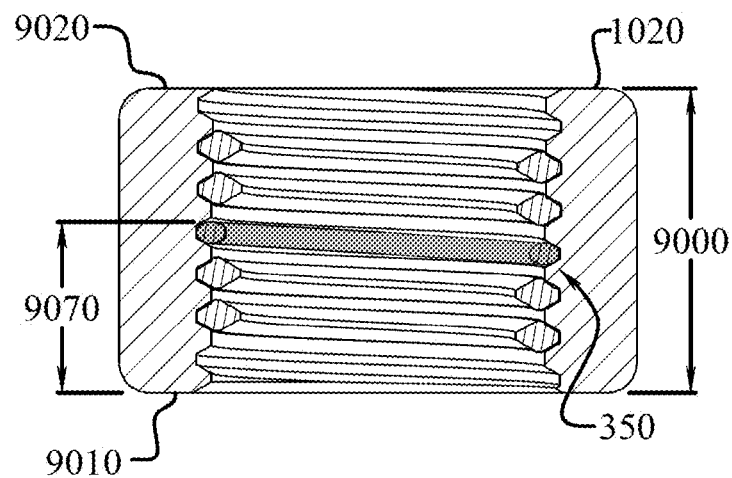
FIG. 30C shows a cross-sectional view of a helical thread insert within a nut.

The location of the locking coil 350 has unexpectedly been linked to improved performance. With reference again to FIG. 30A, the nut 1020 has a load bearing end 9010 and a free end 9020. The shaft 4080 enters the nut 1020 from the load bearing end 9010. As seen in FIG. 30A, the nut 1020 may have a cross-sectional shape in a transverse plane TP, which is perpendicular to the longitudinal axis LA, that is constant from the load bearing end 9010 to the free end 9020. Alternatively, as seen in FIG. 30B, the nut 1020 may have a variable cross-sectional shape in a transverse plane TP, often incorporating a tool-engagement portion 9040, often a hex shape, separated from a load bearing portion 9050, often a round shape, by a transition portion 9060, or transition from the tool-engagement portion 9040 to the load bearing portion 9050.

In such an embodiment, locating the locking coil 350 so that it is not within the transition portion 9060 has been shown to improve the stress distribution in the nut 1020. Stated another way, locating the locking coil 350 so that it is in a location in which the nut 1020 has a transverse cross-sectional shape that doesn't change from a first transverse plane to a second transverse place, where the first transverse plane is located at the point where it just contacts the point on the locking coil 350 that is furthest away from the load bearing end 9010, which corresponds to the location of the leader associated with 9070 in FIG. 30A, and the second transverse plane is located at the point where it just contacts the point on the locking coil 350 that is closest to the load bearing end 9010, which in FIG. 30A would be just below the arrow head associated with the label 350. Thus, in such an embodiment the locking coil 350 would be located so that no portion of it falls within the transition portion 9060 of FIG. 30B. In the illustrated embodiment of FIG. 30B the locking coil 350 is located entirely between the free end 9020 and the start of the transition portion 9060, however in another embodiment the locking coil 350 is located entirely between the load bearing end 9010 and the transition portion 9060.

In a further embodiment having transverse planes TP possessing different cross-sectional shapes, the nut 1020 has a portion that does possess a constant cross-sectional shape in the transverse planes over a constant shape length, and the locking coil 350 is located within the constant shape length. In the embodiment of FIG. 30B, both the tool-engagement portion 9040 and the load bearing portion 9050 possess a constant shape length, and thus the locking coil 350 is located in either the tool-engagement portion 9040 or the load bearing portion 9050.

In further embodiments applicable to both constant and variable cross-sectional shape configurations of the nut 1020, the locking coil 350 is located closer to the free end 9020 than the load bearing end 9010. In fact, in another embodiment a portion of the locking coil 350 is located a locking offset distance 9070, measured from the load bearing end 9010, that is at least 55% of the nut length 9000, and at least 60%, 65%, and 70% in further embodiments. Unless noted otherwise, the locking offset distance 9070 is the distance from the load bearing end 9010, or nut proximal end, to the farthest away portion of the locking coil 350, as seen in FIGS. 30A-30E. In another series of embodiment the locking offset distance 9070 is no more than 95% of the nut length 9000, and no more than 90%, 85%, 80%, and 75% in further embodiments.

Figure 30D:
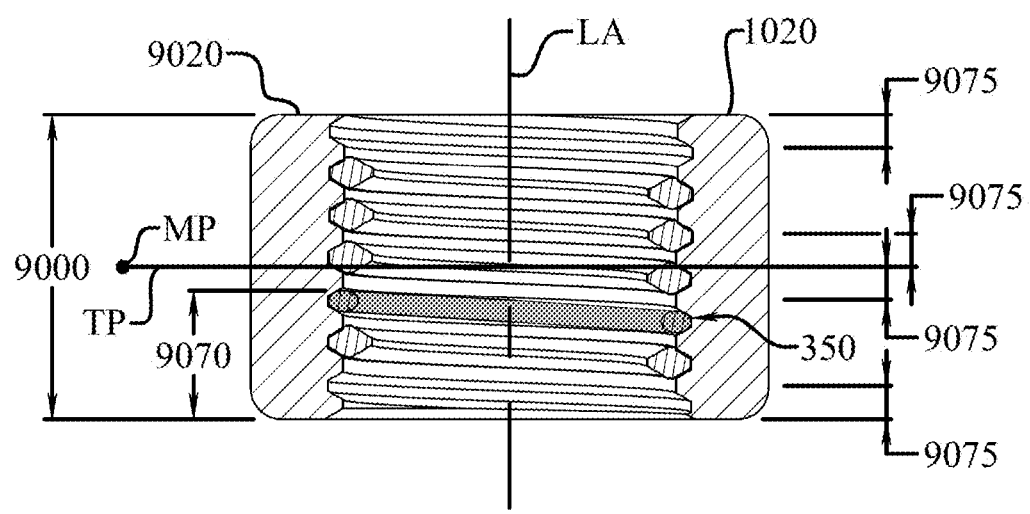
FIG. 30D shows a cross-sectional view of a helical thread insert within a nut.
Figure 30E:
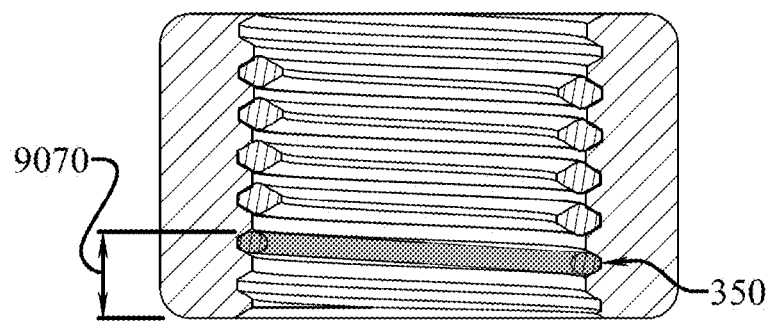
FIG. 30E shows a cross-sectional view of a helical thread insert within a nut.
Figure 30F:
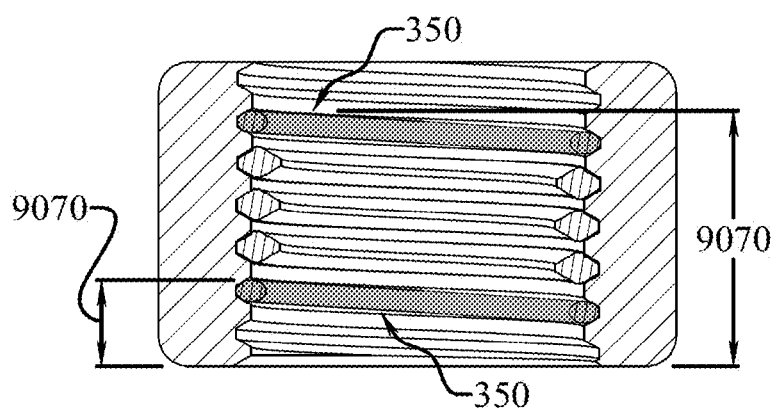
FIG. 30F shows a cross-sectional view of a helical thread insert within a nut.
Figure 30G:
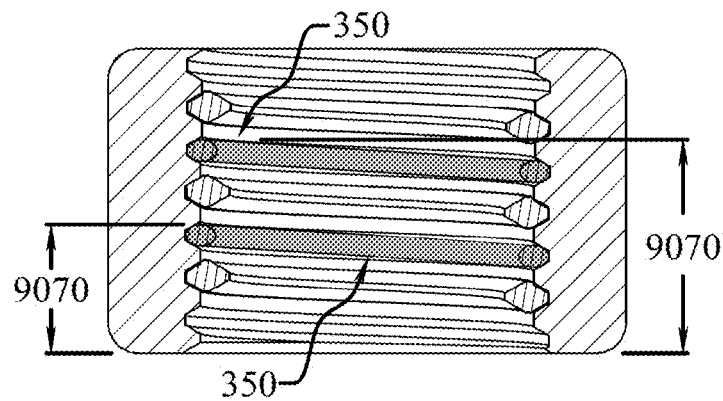
FIG. 30G shows a cross-sectional view of a helical thread insert within a nut.
Figure 30H:
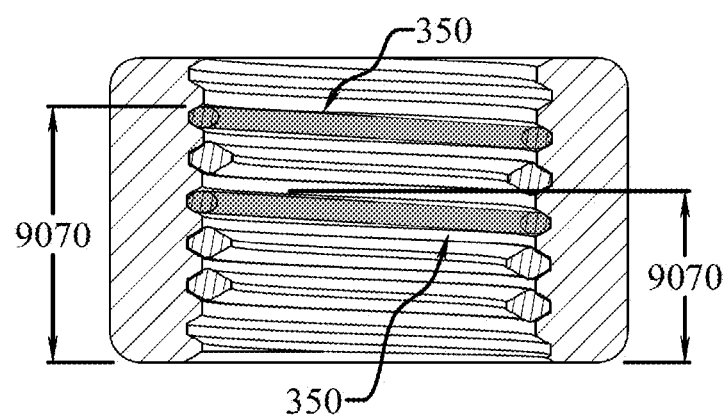
FIG. 30H shows a cross-sectional view of a helical thread insert within a nut.
Figure 30I:
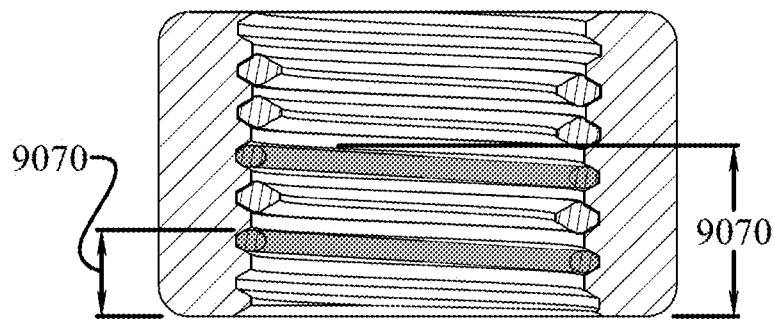
FIG. 30I shows a cross-sectional view of a helical thread insert within a nut.
Figure 30J:
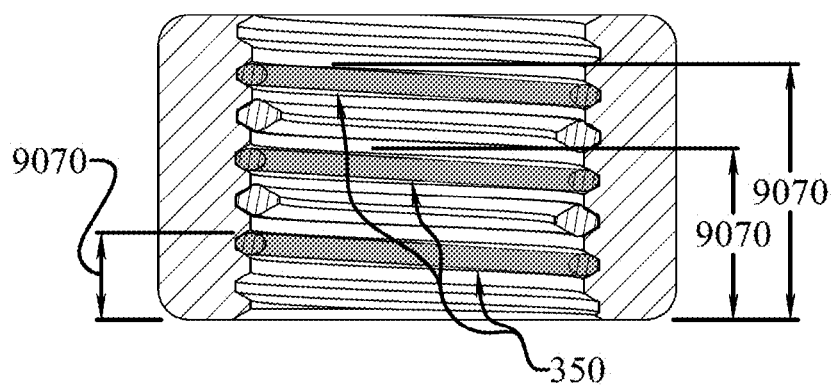
FIG. 30J shows a cross-sectional view of a helical thread insert within a nut.

In still further embodiments no portion of the locking coil 350 is within a lock-free zone, which is defined by a predetermined lock-free distance 9075 measured parallel to the longitudinal axis LA from the load bearing end 9010, the free end 9020, and/or a transverse plane TP passing through the midpoint of the nut length 9000, as illustrated in FIG. 30D. In one embodiment the predetermined lock-free distance 9075 is 5% of the nut length 9000, and 150, 15%, 20%, and 25% in additional embodiments. In another series of embodiments the lock-free distance 9075 is no more than 50% of the nut length 9000, and no more than 40%, 30%, and 25% in further embodiments. The load bearing end 9010 and the free end 9020 may be the nut proximal end or the nut distal end depending on the installation configuration; however to be consistent with the general nomenclature of the illustrated embodiments and FIG. 8 the load bearing end 9010 is the nut proximal end.

The locating of the locking coil 350 within the nut 1020 is further improved, as is the associated stress distribution in the nut 1020, when the helical thread insert 1030 has a different number of regular coils 360, i.e. coils having a circular end profile, also referred to as circular coils, on opposite sides of the locking coil 350. For instance, in one embodiment, one side has at least one additional regular coil 360, and at least two additional regular coils 360 in another embodiment, as seen in FIG. 30B, and at least three additional regular coils 360 in still a further embodiment. There are at least two regular coils 360 on each side of the locking coil 350 in another embodiment, and at least one side has at least four regular coils 360 in a further embodiment, and in yet another embodiment one, or both, sides have no more than ten regular coils 360.

More than one locking coil 350 may be incorporated in a helical thread insert 1030, as seen in FIGS. 30F-30J, with some embodiments having at least two locking coils 350, and another embodiment having at least three locking coils 350; however, further embodiments cap the number of locking coils 350 at no more than one locking coil 350 for every two regular coils 360, and no more than one locking coil 350 for every three regular coils 360, and no more than one locking coil 350 for every four, five, six, or seven regular coils 360 in still further embodiments. Further, an insert longitudinal plane exists and contains the insert longitudinal axis LA, seen in FIG. 27B, and in some embodiments a locking coil cross-sectional shape in the insert longitudinal plane is different than a regular coil cross-sectional shape in the same plane, as illustrated in FIG. 30B.

A problem overcome by these embodiments originates from the fact that in a conventional nut, without a helical thread insert 1030, the first thread typically takes on 38% of the load, with the second thread bearing 25% of the load, and the third thread bearing 18% of the load; thus, 81% of the load is distributed across the first three threads. This is not ideal and often necessitates a nut material having a hardness above a Rockwell C hardness of 39 RWC, which would make it prone to hydrogen embrittlement. Additionally, the likelihood of failure of the first thread is increased due to dilation of the nut flange and thread bending due to undesirable stress distribution in a conventional nut. Dilation and thread bending cause the major diameter of the nut thread to increase thus decreasing the shear stress area of the already critically loaded first three threads. Theoretical and practical studies of this phenomenon indicate that the top face of the nut contracts in a radial direction while its bearing surface expands. Thus, without high temper materials to withstand the effects of extreme shear stress on the first three threads, conventional MS21042 nuts will split due to nut dilation and/or stripping. Reference to MS21042 nuts refers to nuts meeting Military Specification MS21042 for use in aircraft. Further, high hardness values require precise processing methods to eliminate hydrogen embrittlement and reduce the fracture toughness.

In fact, testing of standard ¼" 28 thread/inch MS21042 nut was performed with a 180 KSI rated bolt and a 6500 lbf axial load, revealing a first thread load of 2462.4 lbs and a first thread stress of 119534 psi, requiring a Rockwell C hardness of 42 RWC to achieve a shear strength of 110,200 psi, and a ductility of only 13%. Conversely, a test fastener referred to as SCF610-4 having an alloy steel nut, also a ¼" 28 thread/inch nut, tempered to only a Rockwell C hardness of 37 RWC, while utilizing the disclosed helical thread insert 1030, had a distinctly different failure mechanism when subjected to the same 6500 lbf axial load with a 180 KSI rated bolt. The first thread load of the SCF610-4 test nut was reduced to 1944 lbs with a first thread stress of only 96280 psi, while having an improved ductility of 17% and the Rockwell C hardness of 37 RWC being well below the hydrogen embrittlement threshold. In contrast to the MS21042 nut, the SCF610-4 test nut flange showed no dilation. The SCF610-4 test nut exhibited a significant reduction in shear stress area occurred near the middle of the nut instead of at the base, as in the MS21042 nut. This is clear indicator of preferred load distribution in the threads of the SCF610-4 test nut. In the SCF610-4 test nut, as the load increased, the middle threads plastically deformed first then the lower threads. Since the SCF610 test nut material is softer and more ductile than MS21042 nut, brittle failure did not occur in the SCF610 test nut, and the lower threads took on more load.

The SCF610 test nuts surpassed the NASM21042 tensile load requirement across the range of critical tolerances. This is important in that it allows a more forgiving manufacturing process that is consequently easier to control. Further, the helical thread insert 1030 provided a tensile strength advantage due to load sharing. Such load sharing allows the SCF610 test nut material to be softer and more ductile than comparable MS21042 nuts, thereby eliminating hydrogen embrittlement issues and the resulting catastrophic failure and FOD issues. Incorporation of the helical thread insert 1030, in nuts of similar size and performance requirements, also allows corrosion resistant materials such as A286, an iron-nickel-chromium alloy with additions of molybdenum and titanium, which is one of the most popular high temperature alloys, since as an austenitic alloy it maintains good strength and oxidation resistance at temperatures up to 1300° F. Thus, the helical thread insert 1030 facilitates the use of materials having lower tensile strengths in corrosive environments in place of hard alloy steels with expensive cadmium plating and hydrogen bake out processes, which is a tremendous benefit. Therefore, in one embodiment the nut 1020 has no plating.

The tensile strength, hardness, thermal coefficient of expansion, and/or percent elongation relationships among the various components plays a significant role in improved performance, durability, and, in some cases, reusability. Further, the unique combinations and relationships achieve specific performance goals and are much more than just routine experimentation, and, as one skilled in the art will appreciate, often requires careful and deliberate heat treatments processes to achieve the relationships. The disclosed relationships are related to test coupons formed of the same material and subjected to the same heat treatments, hardening, and/or working as the associated component and tested per ASTM E8.

In one embodiment the Rockwell C hardness of the helical thread insert 1030 is greater than the Rockwell C hardness of the nut 1020 and/or the shaft 4080. In fact, in a further embodiment the Rockwell C hardness of the helical thread insert 1030 is at least 2 units greater than the Rockwell C hardness of the nut 1020 and/or the shaft 4080, and at least 3 units greater in another embodiment, and at least 4 units greater in still another embodiment. However, further embodiments limit the differential in Rockwell C hardness units to avoid negative effects. Specifically, in one embodiment the difference in Rockwell C hardness units is no greater than 13, and no greater than 10 in another embodiment, and no greater than 7 in still a further embodiment. The helical coil insert 1030 has a Rockwell C hardness of no more than 50 RWC in one embodiment, and no more than 47 RWC in another embodiment, and no more than 45 RWC in still a further embodiment. Whereas in another embodiment the helical coil insert 1030 has a Rockwell C hardness of at least 42 RWC in one embodiment, and at least 43 RWC in another embodiment, and at least 44 RWC, and 46 RWC in still a further embodiments. The nut 1020 and/or shaft 4080 has a Rockwell C hardness of no more than 42 RWC in one embodiment, and no more than 40 RWC in another embodiment, and no more than 38 RWC in still a further embodiment.

Further, in another embodiment the coefficient of thermal expansion of the helical thread insert 1030 is greater than the coefficient of thermal expansion of the nut 1020 and/or the shaft 4080. In fact, in one embodiment the coefficient of thermal expansion of the helical thread insert 1030 is at least $1.5 \times 10^{-6}/°$ C. greater than the coefficient of thermal expansion of the nut 1020 and/or the shaft 4080, and at least $3 \times 10^{-6}/°$ C. greater in another embodiment, and at least $4.5 \times 10^{-6}/°$ C. greater in still a further embodiment. However, further embodiments limit the differential in coefficient of thermal expansion to avoid negative effects. Specifically, in one embodiment the difference in coefficient of thermal expansion is no greater than $9 \times 10^{-6}/°$ C., and no greater than $7 \times 10^{-6}/°$ C. in another embodiment, and no greater than $5 \times 10^{-6}/°$ C. in still a further embodiment. The coefficient of thermal expansion of the helical thread insert 1030 is at least $13 \times 10^{-6}/°$ C. in one embodiment, and at least $15 \times 10^{-6}/°$ C. in another embodiment, and at least $16 \times 10^{-6}/°$ C. in still a further embodiment. The coefficient of thermal expansion of the nut 1020 and/or shaft 4080 is no more than $15 \times 10^{-6}/°$ C. in one embodiment, and no more than $13 \times 10^{-6}/°$ C. in another embodiment, and no more than $11 \times 10^{-6}/°$ C. in still a further embodiment.

Additionally, in another embodiment the tensile strength of the helical thread insert 1030 is greater than the tensile strength of the nut 1020 and/or the shaft 4080. In fact, in one embodiment the tensile strength of the helical thread insert 1030 is at least 10 ksi greater than the tensile strength of the nut 1020 and/or the shaft 4080, and at least 20 ksi greater in another embodiment, and at least 30 ksi greater in still a further embodiment. However, further embodiments limit the differential in tensile strength to avoid negative effects. Specifically, in one embodiment the difference in tensile strength is no greater than 60 ksi, and no greater than 50 ksi in another embodiment, and no greater than 40 ksi in still a further embodiment. The tensile strength of the helical thread insert 1030 is at least 195 ksi in one embodiment, at least 205 ksi in another embodiment, and at least 215 ksi in still a further embodiment. The helical thread insert 1030 is made of 304 stainless steel in one embodiment, and is made of cold-rolled stainless steel wire in another embodiment.

Still further, the percent elongation of the helical thread insert 1030 is less than the percent elongation of the nut 1020 and/or the shaft 4080. In fact, in one embodiment the percent elongation of the helical thread insert 1030 is at least 3 percentage units less than the percent elongation of the nut 1020 and/or the shaft 4080, and at least 5 percentage units less in another embodiment, and at least 7 percentage units less in another embodiment. The term percentage units is used to be clear that the terms refers to a difference between measured % values, not a percentage of one of the measured values. For example, if the percent elongation of the helical thread insert 1030 test specimen is 9% and the percent elongation of the nut 1020 test specimen is 12%, the differential is 3 percentage units. However, further embodiments limit the differential in percentage units to avoid negative effects. Specifically, in one embodiment the difference in percentage units is no greater than 20 percentage units, and no greater than 15 percentage units in another embodiment, and no greater than 12.5 percentage units in still a further embodiment.

The side view in FIG. 27B shows a generally cylindrical helical thread insert 1030, with the threads 322 being interrupted by segments of the locking coil 350, as indicated at 325-327. An end view of the helical thread insert 1030 is shown in FIG. 27C, and a cross sectional view in FIG. 27D. From the top view shown in FIG. 27C, the internal threads 322 of threadbore 320 combine to create a generally circular end profile, with the locking coil faces 324-329 interrupting the smooth profile of the internal threads 322. In practice, the characteristics of a helical thread insert 1030 installed in a nut 1020 will serve to retain an inserted shaft 4080 in position and resist any backing-out of the shaft 4080 to a reverse torque specification determinable according to the characteristics of the helical thread insert 1030. Properly installed, the helical thread insert 1030 will bear against both the inserted shaft 4080 and the threads within nut 1020, thus resisting the initial back-off movement and further retaining the inserted shaft 4080 against a reverse prevailing torque.

Additional performance benefits have been found to be attributed to the surface roughness of the helical thread insert 1030. Conventional thinking results in the production of inserts that are exceedingly smooth and described as virtually eliminating friction-induced thread erosion with an average Ra roughness value of 32 μin. For perspective, a cold rolled, heat treated, skin passed stainless steel with a 2B surface finish per publication BS EN 10088-2:2014 "Stainless steels—Technical delivery conditions for sheet/plate and strip of corrosion resisting steels for general purposes," of the British Stainless Steel Association, has a roughness of 0.3-0.5 μm, or approximately 12-20 μin. Further, a bead blasted finish produces an average Ra of 1.00-6.00 μm, or 39-236 μin.

The ultimate test for vibration resistance relative to proof load is the Junkers test. Developed in the late 1960s by German engineer Gerhard Junker, the mechanical testing device measures preload in nut and bolt by means of a load cell. The nut and bolt are subjected to shear loading by means of transverse vibration and proof load is constantly measured. Testing has shown a typical NAS9926 nut with an initial compressive load of approximately 2000 lbf and initial torque of approximately 11 ft-lbf retains only 57-60% of the initial compressive load after 400 vibrational cycles (12.5 Hz, +/−0.026" transverse displacement, 75° F.), and only 37-56% of the initial compressive load after 2000 vibrational cycles. However, introduction of a helical thread insert 1030 in the same size and material nut, and same test conditions, retains 85% of the initial compressive load after 400 cycles (12.5 Hz, +/−0.026" transverse displacement, 75° F.), and 87% of the initial compressive load after 2000 cycles.

Testing has shown thread cycling, defined as assembly and disassembly of the nut and bolt—threaded in, threaded out, significantly impacts the % of the retained load. Specimens were tested at 10, 25 and 50 thread cycles. Specimens that did not contain the helical thread insert 1030 had widely variable retained energy, which is the area under a curve with clamping load retention (%) on the y-axis and vibrational cycles on the x-axis (0-2000). At zero thread cycles the nut containing the helical thread insert 1030 yielded a Junkers test retained energy percentage of 0.86, while the NAS9926 nuts were 0.45-0.59. At 10, 25, and 50 thread cycles the nut containing the helical thread insert 1030 maintained a relatively consistent retained energy percentage of 0.89-0.91, while the NAS9926 nuts had widely variable retained energy percentages of 0.58-0.78. The roughness imparted on the threads of the nut or the helical thread insert 1030 by thread cycling tends to improve the retained energy percentage.

Thus, in one embodiment the threads of the nut 1020 are treated so that a portion of the threads have a roughness of at least 39 μin, and at least 50 μin in another embodiment, and at least 60 μin in still further embodiment. However, another series of embodiments balances the potential negative performance attributes associated with increased roughness by capping the range, thus in one embodiment no portion of the threads has a roughness greater than 200 μin, and no greater than 150 μin, 125 μin, 100 μin, and 80 μin in further embodiments. Likewise, in one embodiment a surface of the helical thread insert 1030 is treated so that a portion has a roughness of at least 39 μin, and at least 50 μin in another embodiment, and at least 60 μin in still further embodiment. However, another series of embodiments balances the potential negative performance attributes associated with increased roughness by capping the range, thus in one embodiment no portion of the helical thread insert 1030 has a roughness greater than 200 μin, and no greater than 150 μin, 125 μin, 100 μin, and 80 μin in further embodiments. In one embodiment the portion of the nut threads having the disclosed roughness is at least 25% of the total surface area of the threads, while in further embodiments it is at least 35%, 45%, 55%, 65%, 75%, 85%, and 95%. Similarly, in one embodiment the portion of the helical thread insert 1030 having the disclosed roughness is at least 25% of the total surface area of the helical thread insert 1030, while in further embodiments it is at least 35%, 45%, 55%, 65%, 75%, 85%, and 95%. In one embodiment the method of creating the disclosed roughness is via chemical milling, electrical discharge machining, milling, broaching, reaming, electron beam texturing, laser etching and/or texturing, plasma etching, electro-chemical, sanding and/or blasting, ultrasonic polishing, and/or magnetic polishing.

Inserts have been used for some time in industry for applications that substantially differ from those disclosed, including, for instance, as a means to repair damaged threads, and have not recognized the desirable performance benefits associated with the disclosed relationships. The primary purpose of such conventional inserts has been to provide renewed threads after thread damage has occurred. Helical thread inserts are not generally used at all in nut bodies in the new and unique manner disclosed herein to achieve the desired goals. The use separate helical thread inserts 1030 inserted in a nut 1020, not cast in a body, prior to the present disclosure has been generally disfavored, as the helical thread insert 1030 adds additional complexity, another separate component, and additional cost, not to mention the material treatments necessary to achieve the disclosed relationships. The present disclosure provides a rationale and adaptable design for implementing helical thread inserts 1030 in a nut 1020 to provide increased strength nuts 1020, with renewable threads, and provides a mechanism for providing a locking or retaining system for nuts 1020 that previously suffered from a number of limitations. The improved nut 1020 disclosed is a heretofore unutilized application of helical thread inserts 1030 to allow for manufacture of a nut 1020 that both provides for a prevailing torque locking fastener, and that increases the useful life of a nut 1020. Importantly, implementation of the improved nut 1020 with helical thread insert 1030 allows for increased strength of the fastener, in excess of what would be predicted based on the previous understanding of the performance of threaded fasteners, and use of softer more ductile materials. The improved fastener even further allows for nuts 1020 of new and/or uncommon materials, providing weight savings and additional performance enhancements. The present helical thread insert 1030 is not subject to the vagaries of wear commonly encountered with both resilient disk fasteners and with crimped locking fasteners. A nut 1020 with the helical thread insert 1030 experience significantly less permanent alteration when used in service, such that these fasteners can be repeatedly used until a rated cycle life is exceeded. Further, the helical thread insert 1030 may in certain applications allow for renewal after a given number of insertions, or cycles of operation in place. When the design life is due to be exceeded, the helical thread insert 1030 can be removed and renewed without excessive expense.

Figure 2A:
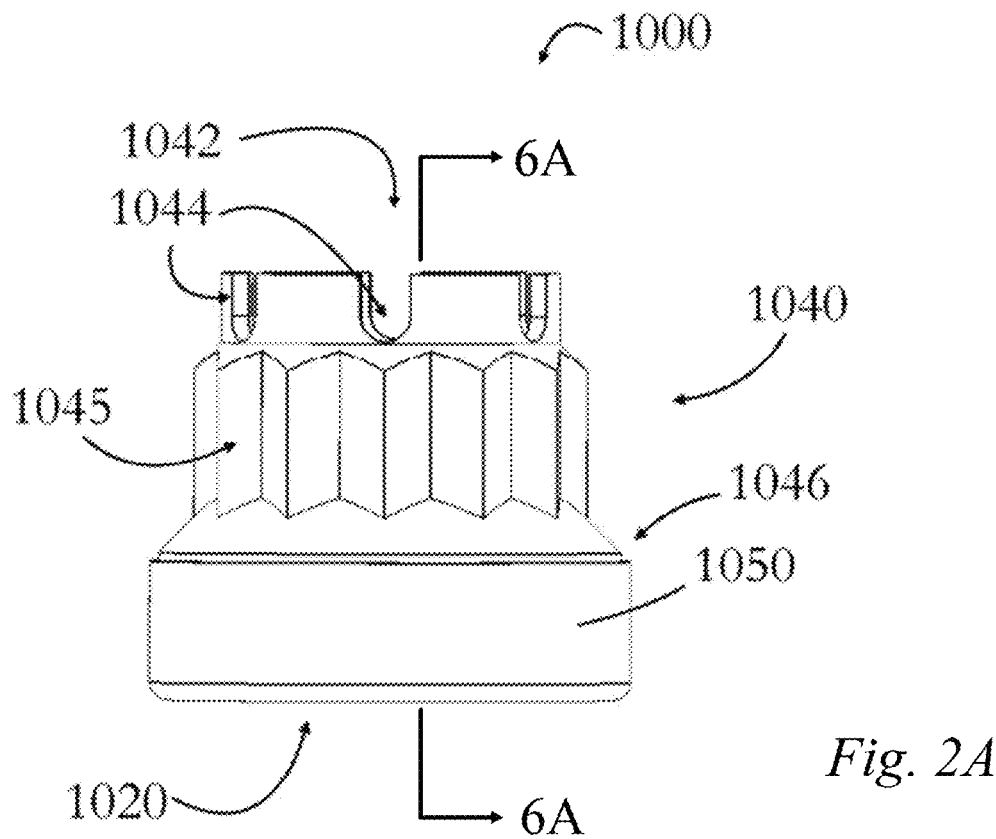
FIG. 2A shows alternative side elevation views of a toque control locking fastener.
Figure 2B:
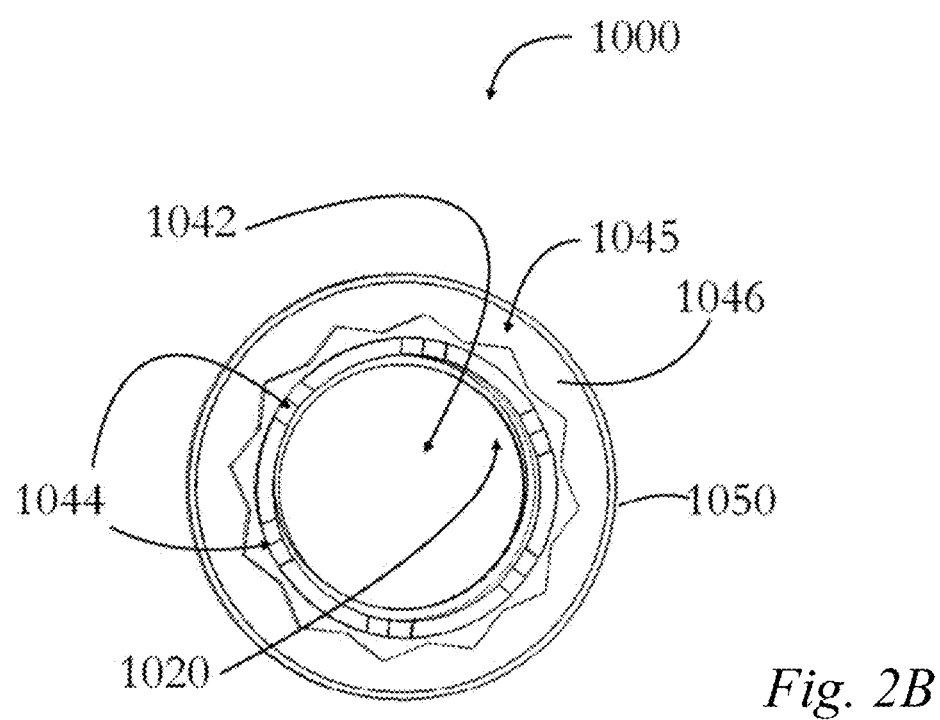
FIG. 2B shows a top plan view of a toque control locking fastener.
Figure 2C:
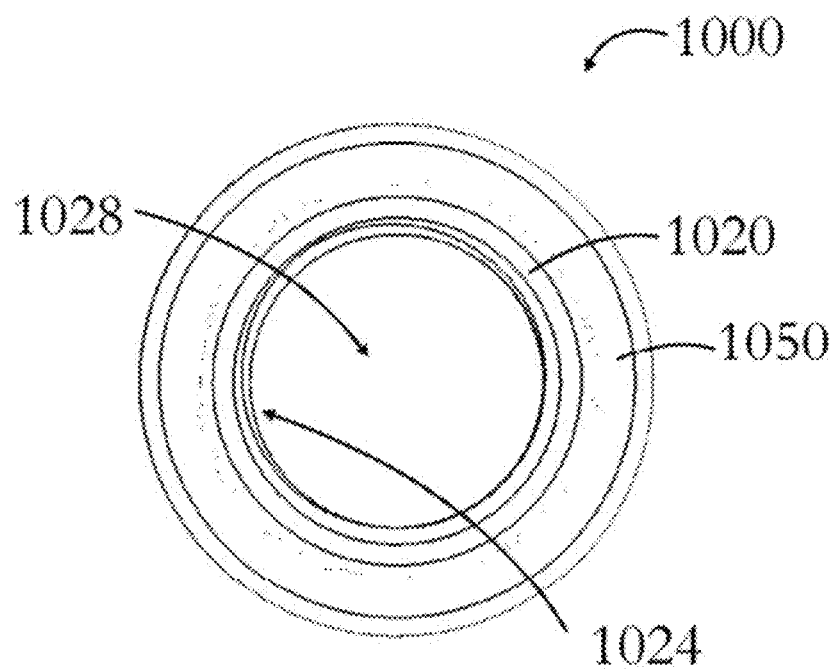
FIG. 2C shows a bottom plan view of a toque control locking fastener.

FIGS. 2A, 2B, and 2C show three directional views of the fastener shown in FIG. 1. FIG. 2A shows a side view of fastener 1000. FIG. 2B shows a top view, revealing the threadbore, and FIG. 2C shows a bottom view. In this embodiment the nut cap 1040 nests inside concentric cap retainer 1050. The nut cap is provided with a series of notches 1044, and the nut cap 1040 provides the wrenching interface 1045. The nut 1020 is formed with a shaft bore, 1042, a portion of which will be formed as a thread bore lined with threads 1024. Threads 1024 can be formed to fit typically desired standard thread, for example, UNF threads. FIG. 2C shows a bottom view of the fastener 1000. Nut 1020 has a generally cylindrical nut body, with an internal bore with threads 1024. Threads 1024 are shown as integrally formed, although STI thread or the like can be provided to allow installation of a helical thread insert. Retainer cap 1050 has compatible rings that allow for the nut cap to be rotated relative the nut body.

FIGS. 3A, 3B, and 3C show detailed views of nut 1020. In FIG. 3A, threads 1024 of nut body 1022 line the thread bore 1028. Nut body 1022 is provided with at least one ring 1025 of locking serrations, or teeth and notches around the nut body perimeter. The illustrated embodiment has two rings 1025 that are separated by a smooth rotation ring 1026. The illustrated embodiment has two smooth rotation rings 1026 that are slightly smaller diameter than the locking serration rings 1025, so that when the nut cap serration rings are aligned with the nut body rotation rings, the nut cap 1040 can be rotated. FIG. 3B shows a top view of nut 1020, along with the notches and teeth ring 1025, threadbore 1028, lined by threads 1024. FIG. 3C shows a cross section of nut body 1020. FIG. 3C shows nut body 1020, with external locking serration rings 1025 and rotation rings 1026. Fastener nut body 1020 is threaded, as shown in FIG. 3C, with STI threads 1024 and the thread bore 1028 is provided with a helical insert 1030 that occupies the threads of the fastener. Fastener nut body 1022 thread bore 1028 is shown filled by a helical insert 1030. Helical insert 1030 may be selected from a wide range of available helical inserts to occupy the depth of thread bore 1028. The helical insert 1030 can be either a prevailing torque insert (as shown) or free running. An installed helical insert 1030 can be held in position by a retainer, as shown by detents 1032.

Figure 4:
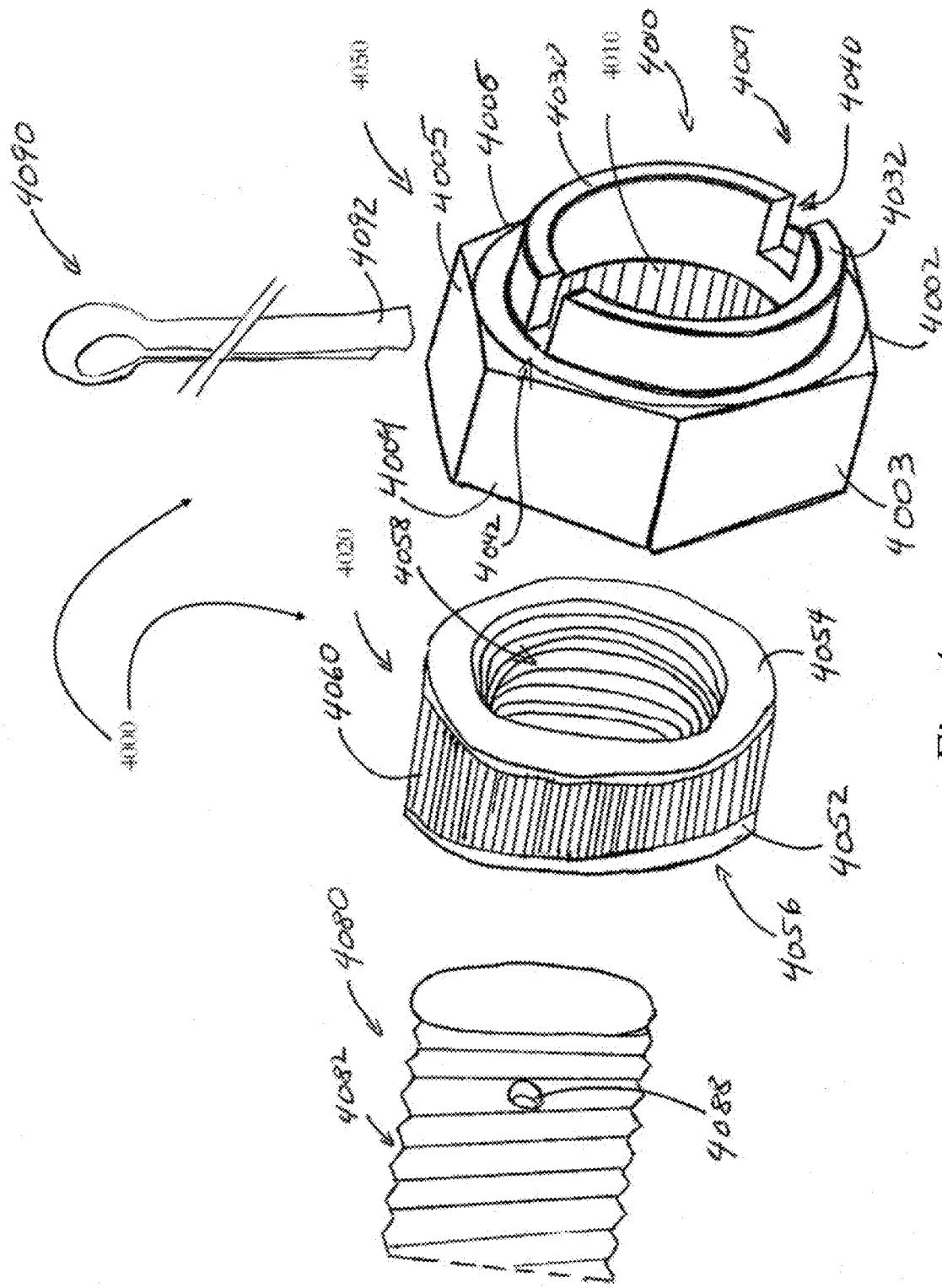
FIG. 4 shows a perspective view of a serrated cap, and compatible fastener for a serrated locking fastener.

FIG. 4 shows an exploded perspective view of the set of components utilized with the disclosed system. Fastener 4000 is comprised of is a compatibly serrated removable cap 4050 for use with a version of the fastener, and a threaded locknut nut 4020. (See also fastener 1000 of FIG. 1). Cap 4050 has an externally hexagonal shape as is common for machine nuts, with faces 4002-4007. Cap 4050 is formed with a bore 4010. Bore 4010 is formed with vertical internal serrations 4040. Bore 4010 also has tab extensions 4030 with lock slots 4042, 4044 between tabs 4030.

In this embodiment the nut 4020 is externally serrated, as at 4060, and externally compatible with cap 4050, and is internally threaded to be compatible with a mounting shaft, such as shaft 4080, or with a bolt or stud. A distal bearing face 4056 bordered by clear ring 4052 will bear against a surface associated with shaft 4080 (or with a pulley, or support brace, for instance) and proximal bearing face 4054 bears against the inside of cap 4000.

Threads 4058 of nut 4020 are compatible with threads 4082 on shaft 4080. Shaft 4080 is also provided with a cross bore, such as bore 4088, so that a lock can be passed through the shaft to lock it into place. In order to lock the shaft 4080 and fastener 4000, the fastener 4000 (of nut 4020 and cap 4050) is driven onto shaft 4080, and tightened to a specified torque. The cap 4050 is then slipped off the nut 1020, and the cross bore 4088 is aligned with the lock slots (i.e. 4040) on the cap 4050. As shown in FIG. 4, two lock slots 40404042 are provided. Those skilled in the art will recognize that 4 or more lock slots are considered useful for particular applications, and are in keeping with the present disclosure. Following proper torque application, a pin or otherwise compatible lock or wire lock, such as the pin end 4092 of cotter pin 4090, can fit through the aligned lock slot 4040, pass through aligned bore 4088 and lock slot 4042, lock the cap 4050 in place, relative to the fastener 4000 and the shaft 4080.

The internal serration effective diameter of cap 4050 will match the external serration effective diameter of nut 4020 such that cap 4050 will fit over nut 4020 with sufficient clearance between serrations 4010 on the cap and serrations 4060 on the nut 4020 to allow for ease of installation, and removal. Tolerance is minimized to prevent advancement over the serrations. In one embodiment of the disclosure, cap 4050 is placed over nut 4020 and installed together, to thread, wrench, and properly torque fastener 4000. Cap 4050 is then removed and remounted to properly align slots 4040 with a keyhole in the shaft 4080 onto which fastener 4000 is threaded. Cotter pin 4090 is then inserted through slots 4040, the keyhole bore 4088 in the shaft, and then slot 4042 (for instance) on the opposite side of cap 4050. Thus, a precise torque can be imposed on the nut, and the torqued nut need not be advanced or loosened in order to add a positive lock. Previous positive locking nut cap combinations do not allow for application of a precise torque because the locking crennelations seldom are coincident with the specified torque position.

For certain applications, two pin slots 4040 are desired. In other applications, 4, 6 or 12 slots may be desirable, with a limit to the number of slots 4040 reached when the tabs 4030 are no longer sufficiently robust to limit the reverse torque that may be applied to the mounted fastener 4000.

Figure 5A:
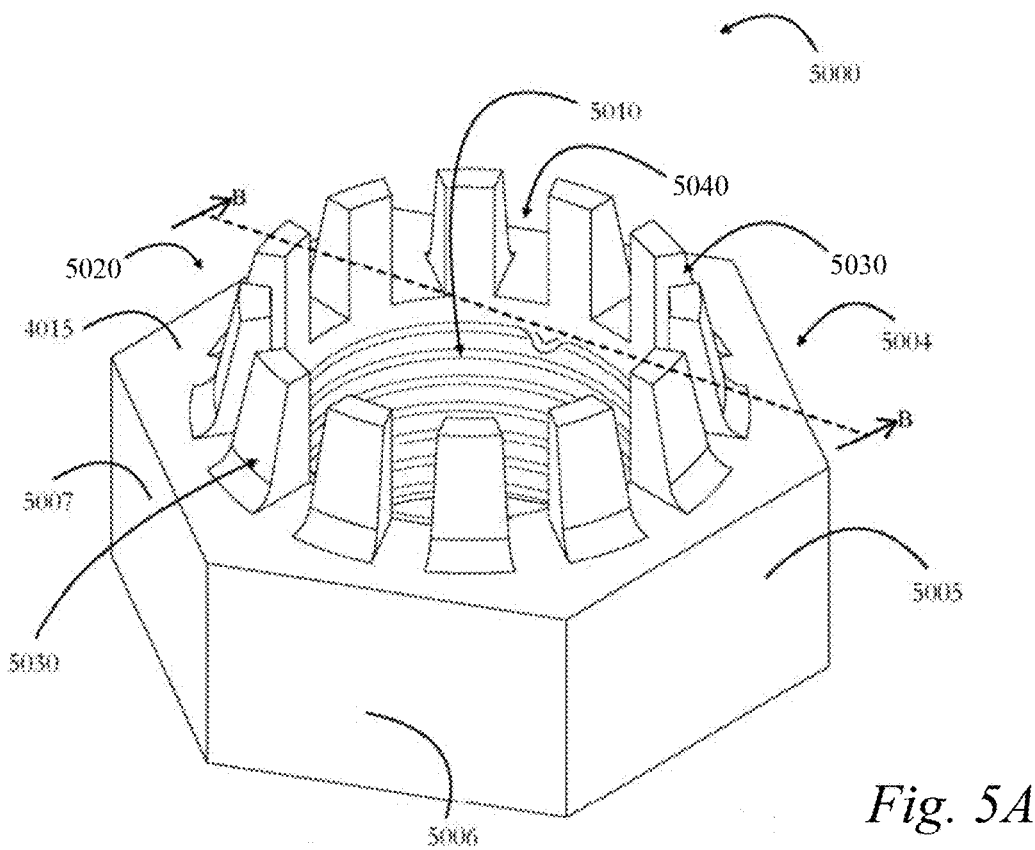
FIG. 5A shows view of an alternative castellated nut for a positive locking fastener.
Figure 5B:
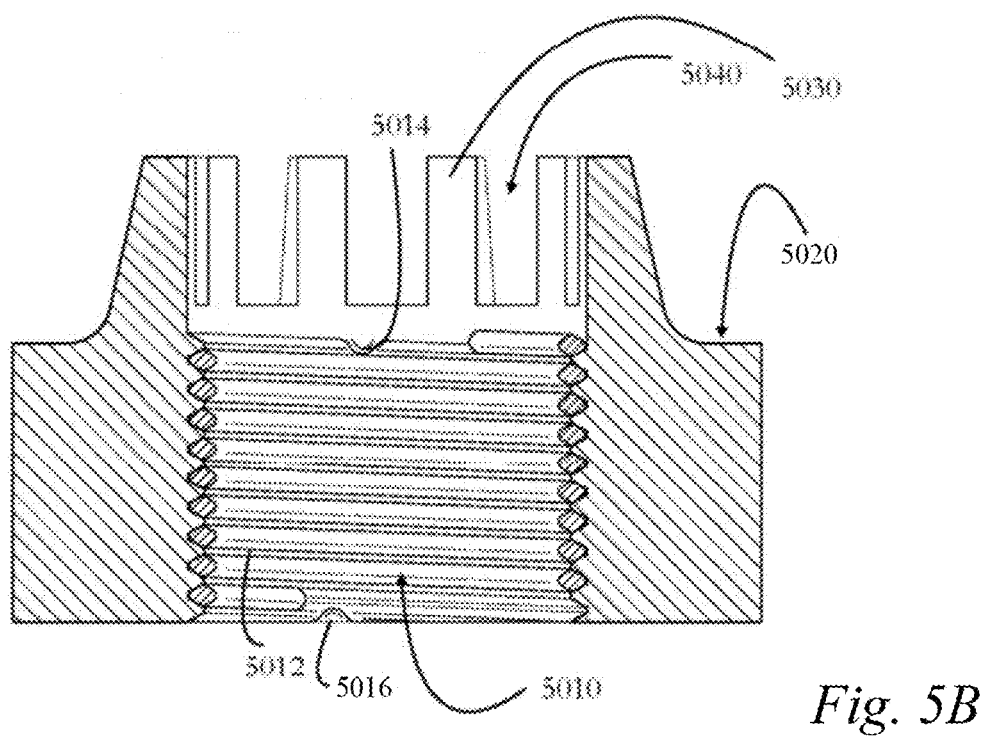
FIG. 5B shows a cross-sectional view of a castellated nut for a positive locking fastener.
Figure 5C:
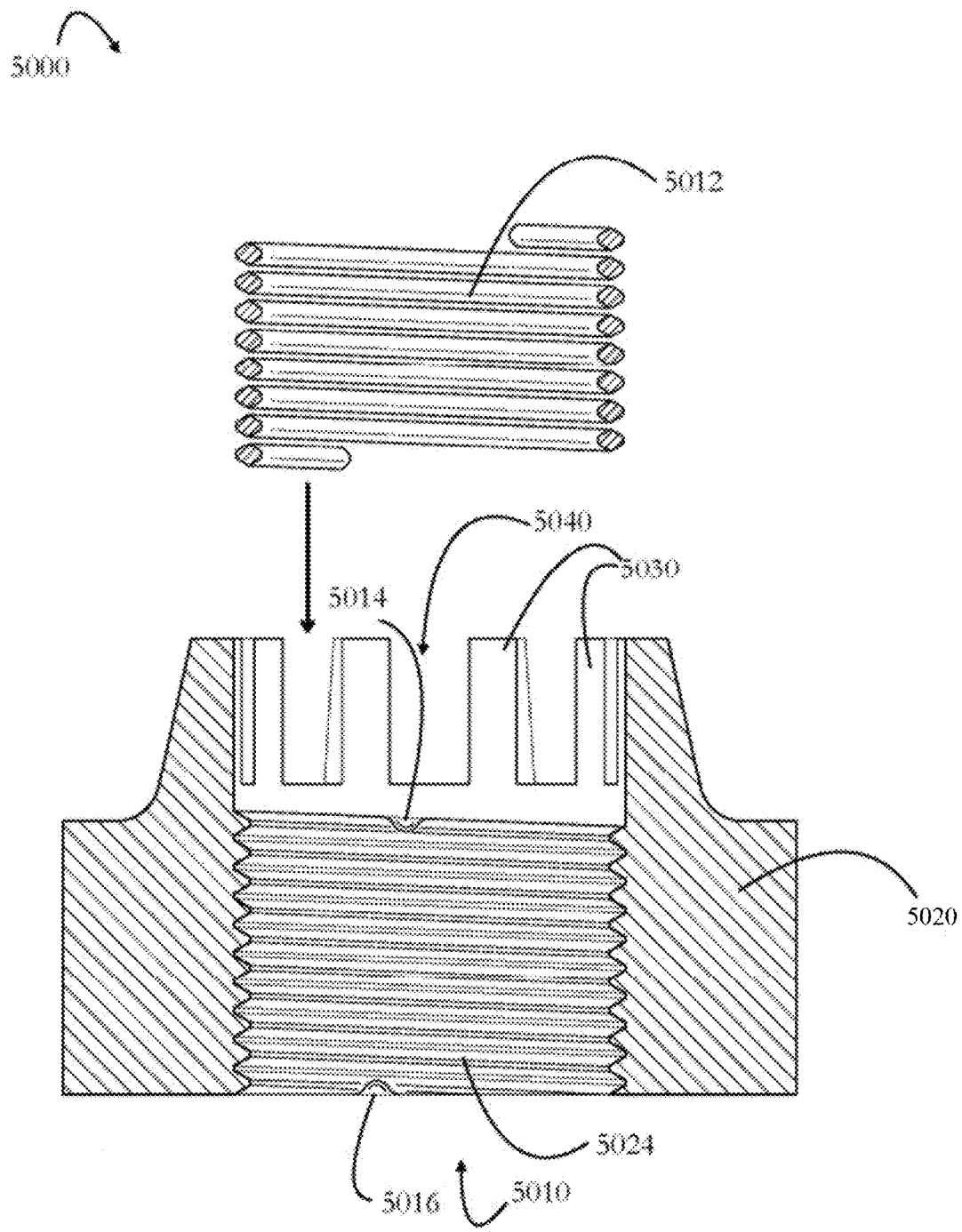
FIG. 5C shows an exploded cross-sectional view of a castellated nut for a positive locking fastener.

FIGS. 5A, 5B, and 5C show views of an alternative embodiment fastener 5000 without a separate serrated removable cap as shown in regards to fastener 1000 of FIG. 1. FIG. 5A shows a tip perspective view, FIG. 5B shows a cross section through plane B-B, and FIG. 5C shows an exploded cross section. Fastener 5000 has an externally hexagonal shape as is common for machine nuts, with faces 5002-5007. Again, those skilled in the art will recognize that other nut shapes are applicable to the disclosure. Fastener 5000 is formed of nut body 5020 with a bore 5010. Bore 5010 of nut body 5020 also has tab extensions 5030 with slots 5040 between tabs though which a cotter pin or retaining wire can fit. Tab extensions 5030 are formed as part of the nut body 5020, and must be strong enough to resist a nominal reverse torque to safely lock the fastener in place when a key, pin or wire is installed. As shown in FIG. 5A, twelve tab extensions are provided, and tab extensions alone are preferably twelve, sixteen or eighteen in number, and should be aligned in an opposite manner so that a pin can pass straight through a slot, a cross bore and an opposite slot.

The internal threads of fastener 5000 can be formed to be compatible with a helical thread insert, such as helical insert 5012. Helical insert 5012 is shown as a free running insert, and may be trapped in the threadbore 5010 by thread perturbations, such as detents 5014, 5016. As in FIG. 4, a cotter pin can be inserted through slots 5040, the keyhole in the shaft, and then an opposite slot on the opposing side of fastener 5000. Thus, the nut is precisely torqued and then locked in place.

Existing locking fasteners are often characterized as either "positive locking" or a "prevailing torque" locking fastener. In a positive locking fastener, the threaded on portion of the fastener, typically a nut, is mechanically held in its prescribed position by some type of mechanical locking feature. As shown above, or the nut to be released, or backed off from its specified final position, in a positive locking fastener, some mechanical failure must occur, such as shearing of metal, or displacement of retainer pin for the nut to move.

A prevailing torque mechanical fastener utilizes a specified torque or opposed frictional force to lock the fastener in place. Plastic inserts, such as a Vespel insert in a nut, offset locking washers, or crimped deformation fasteners are common examples of prevailing torque locking fasteners. As disclosed herein, the helical insert 5012 functions as a prevailing torque locking fastener. It can also be combined to add a positive lock as shown. Such lock can be a cotter pin or alternatively a lock or wire.

Figure 6A:
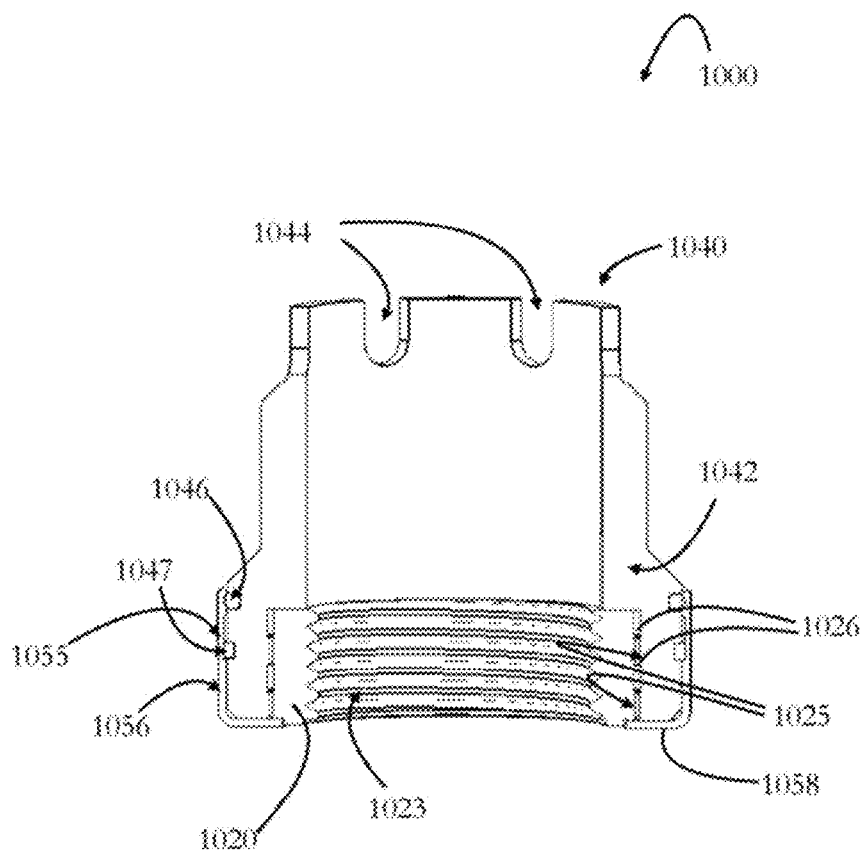
FIG. 6A shows a cross-sectional view of the components of a precise torque control fastener.
Figure 6B:
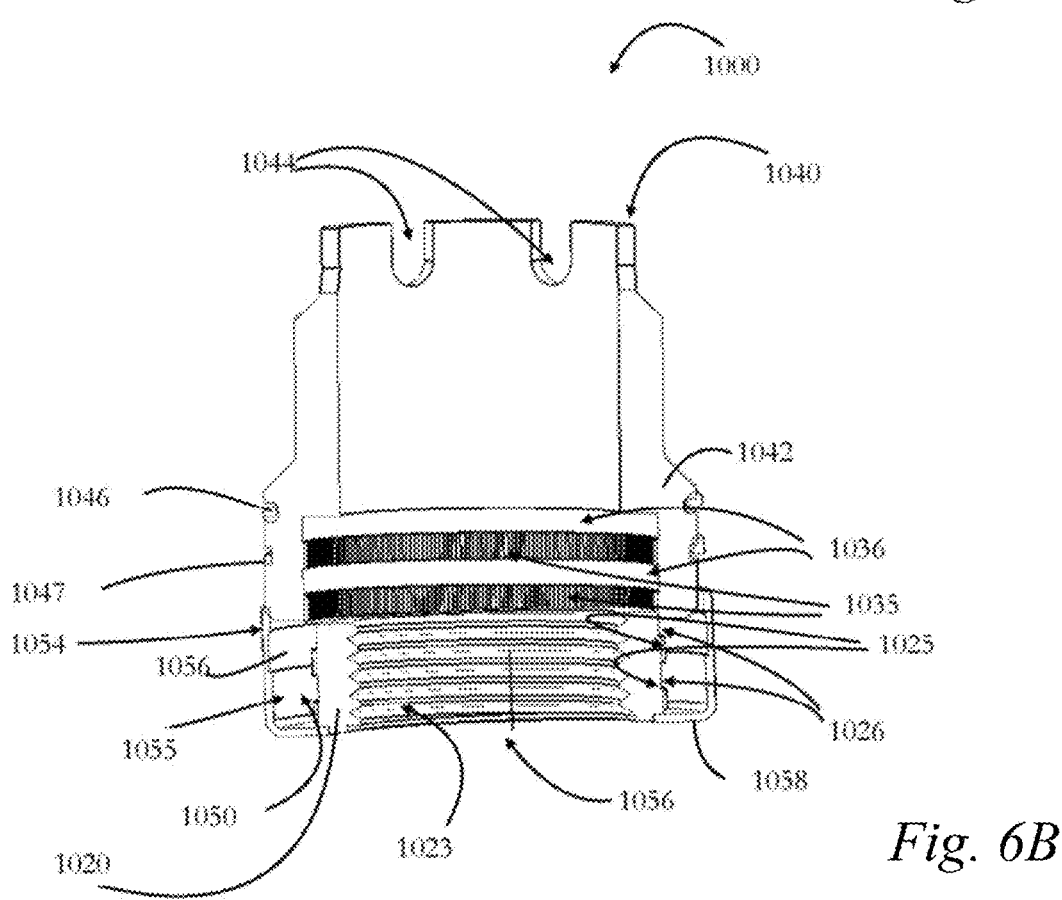
FIG. 6B shows an exploded cross-sectional view of the components of a precise torque control fastener.

FIGS. 6A and 6B show cross sections to demonstrate the retained cap embodiment for use with a fastener such as fastener 1000 of FIG. 1. Cap 1042 has an externally hexagonal shape. Cap 1042 is formed with bore and formed with vertical serrations 1035, and clearance rings 1036, seen in FIG. 6B. Bore 5010 also has twelve tab extensions 1040 with slots 1044 between tabs 1040 though which a retaining pin can fit.

FIG. 6A shows a cross section of the components of the precise torque control locking fastener with the cap 1042 of the fastener seated on the nut body, so that the serrations are engaged. FIG. 6B shows the fastener 1000, with the cap retracted, releasing the cap for rotation relative to the nut 1020. Retainer 1058 can be implemented to prevent the cap from separating from the nut body, limiting the possibility of foreign object damage when a part is separated. Gasket 1046, along with ring 1047 are formed to limit passage of lip 1054. Clear space 1056, along with land 1055 allow the cap 1040 to rotate while being retained by retainer 1058.

Another existing type of locking nut fastener comprises a nut that has been provided with a thread barrel that is a shape other than round, in particular, an oval thread barrel. One current method of creating an oval thread barrel is to distort, or "crimp" a circular cross section nut barrel to a specified torque, distorting the round cross section to an oval cross section. Such crimped fasteners can function as a prevailing torque locking fastener, but have a number of limitations. These limitations include the difficulty in starting the crimped nut on the thread of a bolt, due to the distortion of the circular cross section. Nuts which are crimped at the time of use may be essentially destroyed by improper or over crimping. Furthermore, it is difficult to reproducibly create a desired fastener that performs within a narrow desired range of prevailing torque. In these fasteners, the amount of back-off resistance (i.e. the prevailing torque of the fastener) is difficult to control and lacks consistency between different lots of crimped fasteners, and between installation events or between different technician installers. See for instance, Barrett, R. T., "Fastener Design Manual," NASA Reference Publication 1228, Mar. 1990.

Another type crimped fastener utilizes three-point crimping (usually used on a larger sizes of nuts). Theoretically more points for crimping are possible (for example four or more).

It is a further embodiment of the disclosed apparatus or device is use of a helical insert as a locking feature for female self-locking fasteners in lieu of other traditional methods such as crimping (oval and three or more points) in order to deliver more consistent torque performance of the fasteners within the specimens of a given production batch. Such use of the new system provides for a reduced scrap rate of fasteners, better maintainability of installed fasteners, and less risk of material performance issues such as micro crack or hydrogen embrittlement for instance. Implementation of the disclosure allows for the elimination negative production issues, such as double crimping, unnecessary additional sorting or the like.

The helical wire insert 5012 of the current disclosure can be a full substitute for crimped locking fasteners, and minimize the existing problems with starting the fastener on a threaded shaft caused by the tolerances resulting from crimping of the fastener into an oval shape.

A further embodiment of the disclosure is the use of helical locking inserts in applications that require high strength fasteners, such as 220 KSI rated12 point nuts. In substituting for the six point fastener shown in FIG. 1, a 12 point nut can be provided with a helical coil insert 5012 that nests within a provided coil pocket of the thread barrel. FIG. 4 shows a perspective view of the helical insert locking nut 4000, with the nut cap 4050 formed as a six sided nut with six driving faces 4002-4007. It will be apparent to those skilled in the art that a variety of other shapes of driving faces can be provided, such as 8, 12, or some other variation from a regular polygonal shape.

Figure 7A:
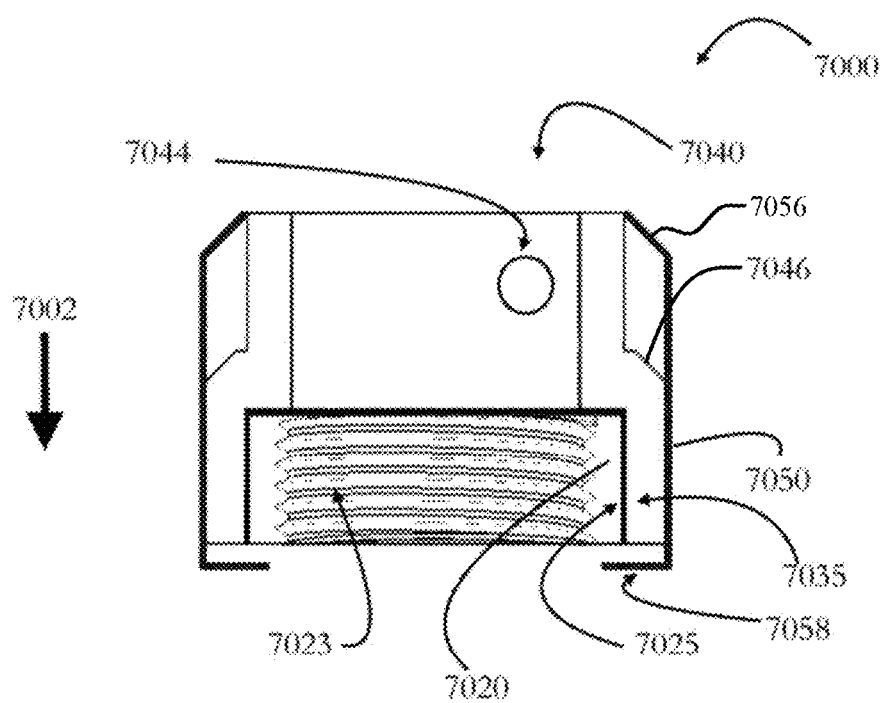
FIG. 7A shows a cross-sectional view of an alternative embodiment of a precise torque control fastener.
Figure 7B:
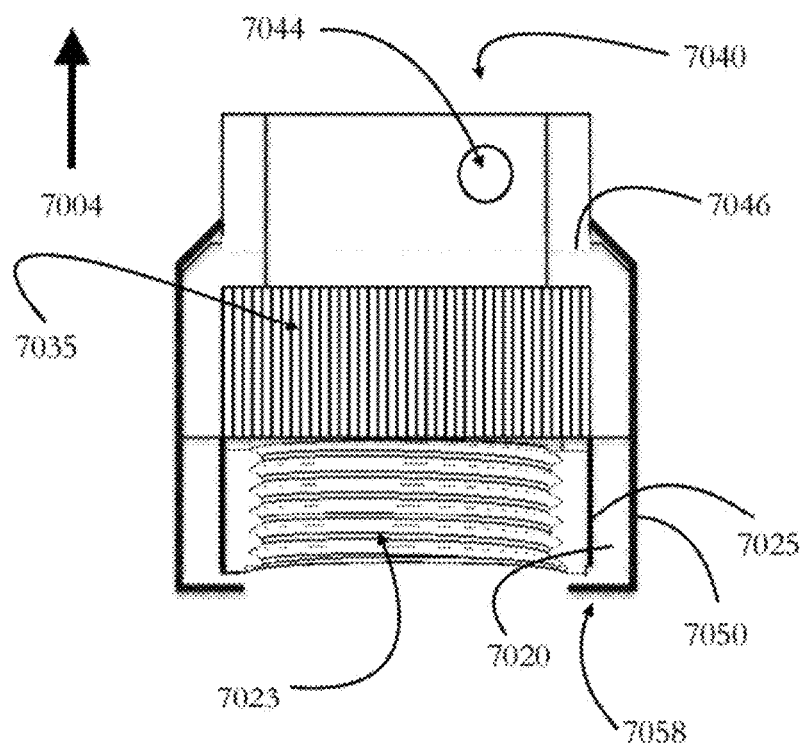
FIG. 7B shows a cross-sectional view of an alternative embodiment of a precise torque control fastener.
Figures 10A, 10B, 10C:
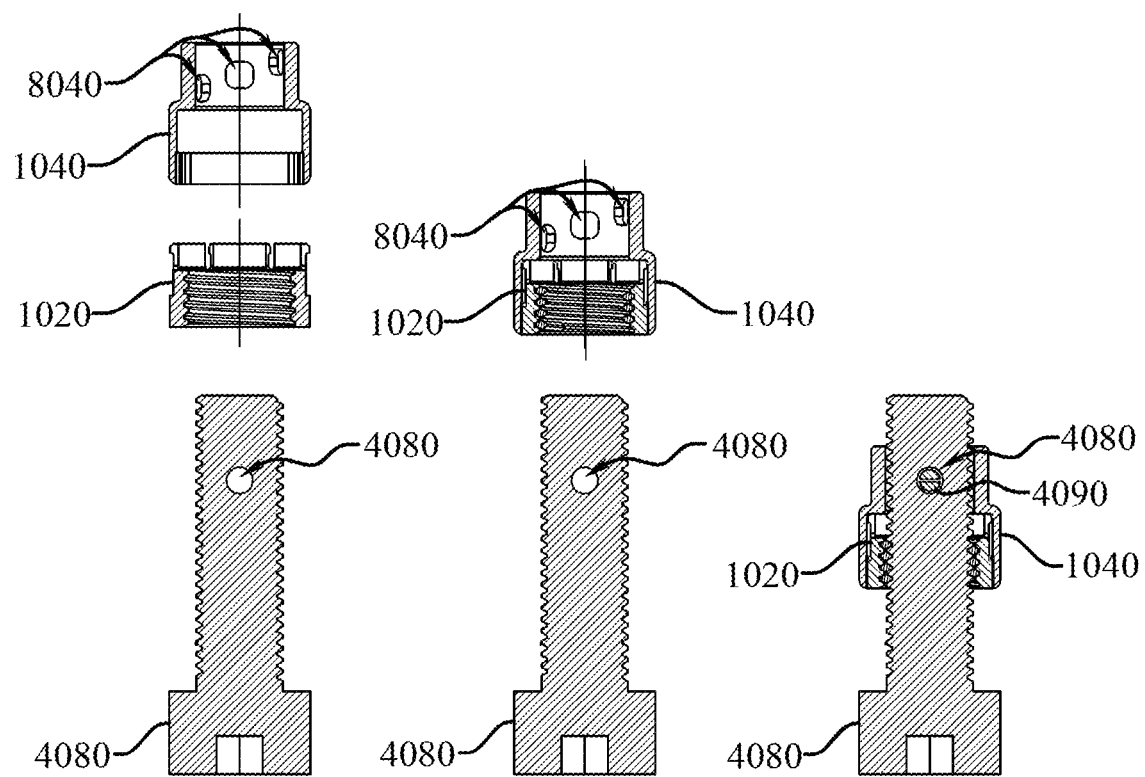
FIG. 10A shows a cross-sectional assembly view of a fastener.
FIG. 10B shows a cross-sectional assembly view of a fastener.
FIG. 10C shows a cross-sectional assembly view of a fastener.
Figure 11:
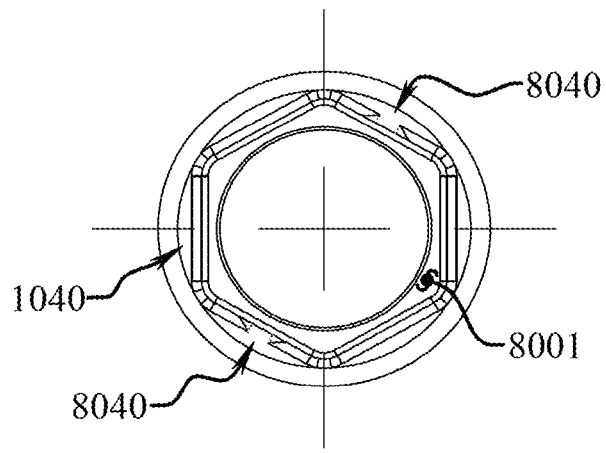
FIG. 11 shows a top plan view of a fastener.
Figure 12:
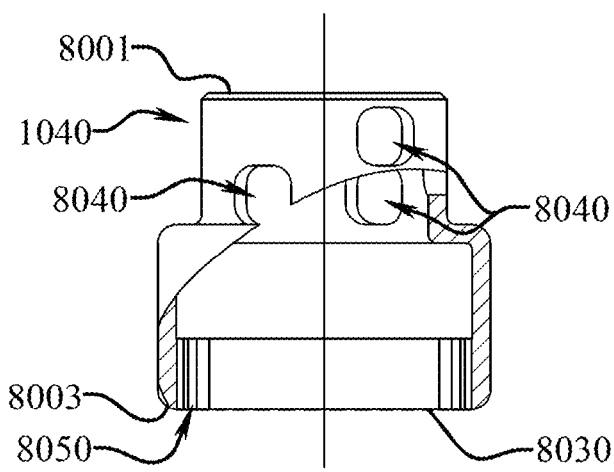
FIG. 12 shows a side elevation view of a nut cap.
Figure 13:
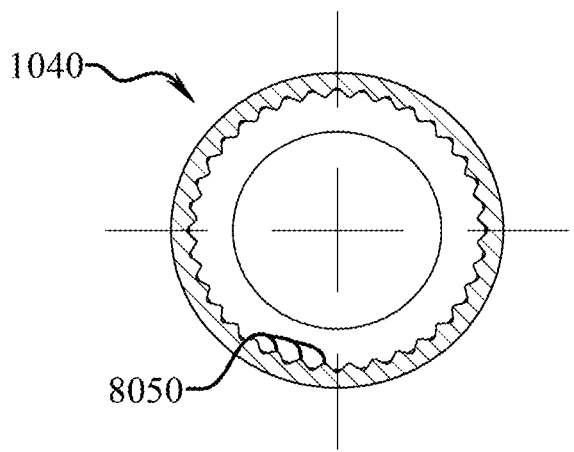
FIG. 13 shows a bottom plan view of a nut cap.
Figure 14:
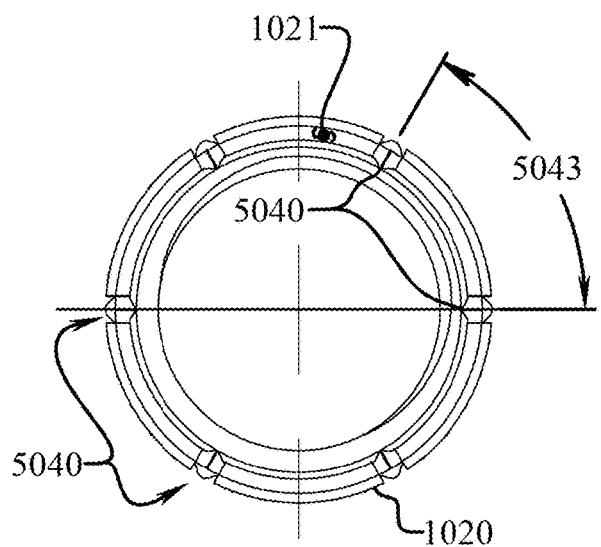
FIG. 14 shows a top plan view of a nut.

FIGS. 7A and 7B show an alternate embodiment of the torque control locking nut. In FIG. 7, the locking nut 7000 is comprised of three primary structural components, nut body 7020, lock cap 7040, and retainer 7050. Nut body 7020 is an internally threaded (as at 7023) hollow cylinder, and is configured with external serrations generally at 7025.

The nut body 7020 surrounds and generally defines a bore, with said bore accommodating a shaft, such as an externally threaded shaft compatible with threads 7023.

Lock cap 7040 has a sleeve portion and a seat body 7046, with internal serrations 7035. Internal serrations 7035 mate in a nesting fashion with the external serrations 7025 of nut body 7020. Said serrations do not necessarily have an identically compatible structure, but must allow for slidable engagement of the compatible serrations. Nut body serrations 7025 may number 24 or 48 individual teeth, proportionally arrayed about the out surface of the nut body. The internal serrations of the lock cap thus must be compatibly arranged, for instance with 48 or 96 proportionally arrayed individual teeth. In such a manner, either the nut body 7020 or the cap 7040 could be provided with more teeth to allow very fine control over the positioning of a nut about a threaded shaft, while not sacrificing overall locking nut strength.

Lock cap sleeve portion is provided with a cross bore 7044 which allows for insertion of a locking pin, such as a Cotter key, retaining wire or the like. As previously described, insertion of a threaded shaft into bore allows the lock cap to be threaded onto the shaft generally longitudinally to arrow 7002 in FIG. 7A, with the nut body freely advancing until the nut body seat is in contact with a bearing surface, whereupon the torque required to advance the nut body along a shaft increases. With the lock cap 7040 engaged about the serrations mating between the nut body 7020, the fastener can be advanced until a precise predetermined torque specification is reached. There is no immediate need to align the cross bore 7044 with a compatible cross bore in the inserted shaft. (Refer to the disclosure in relation to FIG. 5) Once the predetermined torque is reached, the lock cap 7040 is retracted from engagement with the serrations on nut body 7020 by retracting the lock cap in the direction of arrow 7004. Because the nut body 7020 is fully seated and torqued to specification, the nut body 7020 remains in place and the lock cap 7040 and nut body 7020 separate from one another.

As shown in FIG. 7B, and the lock cap 7040 can be rotated about the shaft axis until the lock cap cross bore 7044 aligns with a cross bore in the inserted shaft. When the shaft cross bore and the lock cap cross bore 7044 align, the lock cap 7040 is advanced in the direction of arrow 7002 in FIG. 7A, engaging the serrations 7025 and 7035. Once the locking pin is inserted and secured, the fastener 7000 is held at precisely the predetermined torque until such time as the locking pin is removed and the fastener is counter rotated.

The third component of the locking nut 7000 is retaining collar 7050. Retaining collar 7050 retains the lock cap 7040 and nut body 7020 in association with one another. When lock cap 7040 is urged in the direction of arrow 7002 in FIG. 7A, the nut body 7020 nests within the seat body of lock cap 7040. When the lock cap is withdrawn from association with nut body 7020, by moving the lock cap 7040 in the direction of arrow 7004 in FIG. 7B, the retaining collar 7050 allows disengagement of the nut body 7020 and lock cap 7040. As the disengagement occurs, the withdrawing lock cap 7040 is prevented from full separation from the nut body 7020 by the lock cap shoulder 7046 encountering the retaining collar shoulder 7056. Retaining collar 7050 is further retained in association with the nut body 7020 and the lock cap 7040 by retaining collar heel 7058, which is concentrically circumferential with the bore, the nut body 7020, and the lock cap 7040.

In yet another embodiment of the present disclosure, the helical insert can be utilized with barrel nuts. Barrel nuts are widely used in attaching equipment to an aircraft fuselage. In particular, aircraft jet engines are often attached to the airframe with barrel nuts that include a locking feature. In another example, isolator mounts are produced by the Lord Corporation of Cary, North Carolina In addition, the same or similar fasteners are used in a variety of situations, such as industrial equipment, farm equipment and other equipment where vibration and motion control is required.

These current systems are generally unacceptable because of the expense of the locking inserts and difficulty in installing the locking Vespel insert. An additional difficulty in using such inserts is the need for the bolt fasteners driven into the insert to maintain the specified torque tolerance when in use in an environment that imposes a wide range of temperatures and vibration patterns. As such a locking mechanism is considered important. Currently, the only effective locking or retaining system available for floating inserts is a collar made of resilient material, such as Dupont Vespel (™).

Insertion of a threaded male fastener into the compressed helical insert will cause the spring nature of the compressed insert to resist the anti-rotation of the inserted fastener. Selection of appropriate threads and wire insert can be used to meet particular torque specifications.

It should be recognized that the fasteners system disclosed is applicable to a method of attaching components by providing a fastener that includes a thread bore internally threaded to accept a helical wire insert, inserting a helical wire insert with an external thread that mates with the internal threads of the thread bore, and internal threads of the insert that are compatible with an externally threaded bolt and capable of being driven by a given torque into the helical wire insert, with the helical wire insert resisting the backing out of the driven insert with a torque greater that the given torque for driving the threaded shaft into the helical wire insert.

FIGS. 8A-30 show additional embodiments of the fastener system, which is (a) a combination positive locking and prevailing torque fastener system when a helical insert 1030 is used in conjunction with a positive locking nut cap 1040, versus (b) a positive locking fastener system when used without the helical insert 1030, versus (c) simply a prevailing torque fastener system when used with the helical insert 1030 but without the positive locking nut cap 1040, or with a nut cap that does not incorporate the positive locking features. Thus, all disclosure applies to all variations and need not include each and every one of the disclosed components or features. As a preliminary note, references to a distal end of a component or the system refer to those aspects nearest the top of FIG. 8A, while references to a proximal end of a component or the system refer to those aspects nearest the bottom of FIG. 8A, unless noted otherwise.

Figure 15:
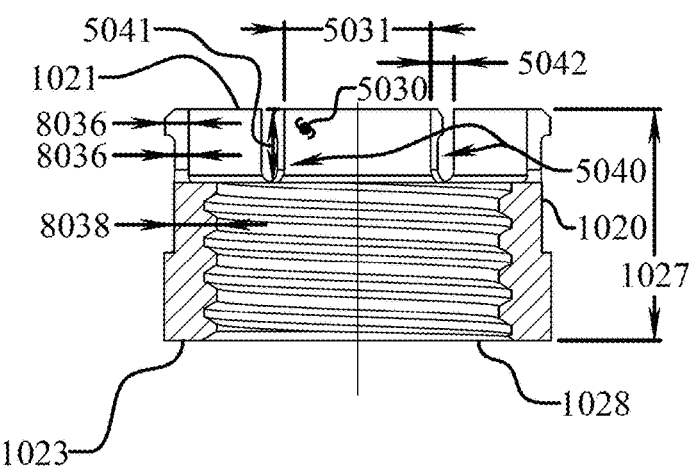
FIG. 15 shows a cross-sectional view of a nut.
Figure 17:
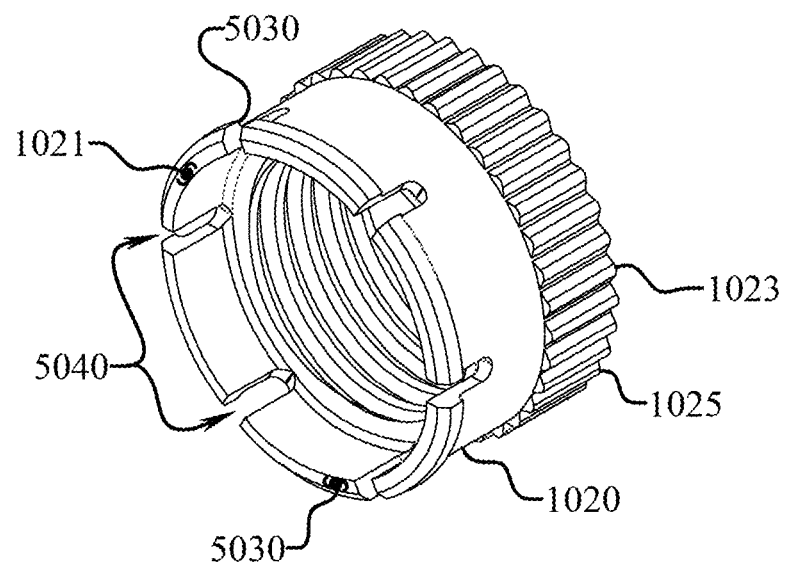
FIG. 17 shows a perspective view of a nut.

With reference first to the nut 1020, seen best in FIGS. 17 and 15, it has a nut distal end 1021 and a nut proximal end 1023, thereby defining a nut length 1027. The nut 1020 has a nut bore 1028 extending into the nut 1020 from the nut proximal end 1023, and may extend all the way through the nut 1020 to the nut distal end 1021, or only a portion of the nut length 1027, and at least a portion of the nut bore 1028 contains a plurality of nut bore threads. The nut 1020 may include a plurality of nut slots 5040 extending from the nut distal end 1021 toward the nut proximal end 1023, and having a nut slot depth 5041 and nut slot width 5042, as seen in FIG. 15. One such embodiment includes at least two nut slots 5040, while another embodiment includes at least four, and the illustrated embodiment includes at least six. One embodiment has a slot separation angle 5043, seen in the top plan view of FIG. 14, that is no more than 90 degrees, and is 30-60 degrees in a further embodiment.

Figure 18:
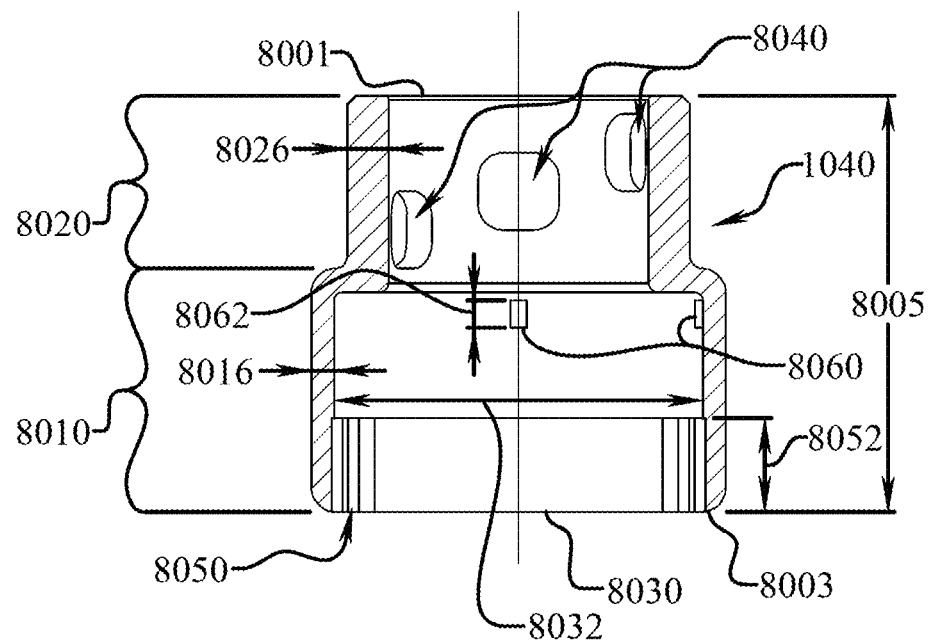
FIG. 18 shows a cross-sectional view of a nut cap.
Figure 19:
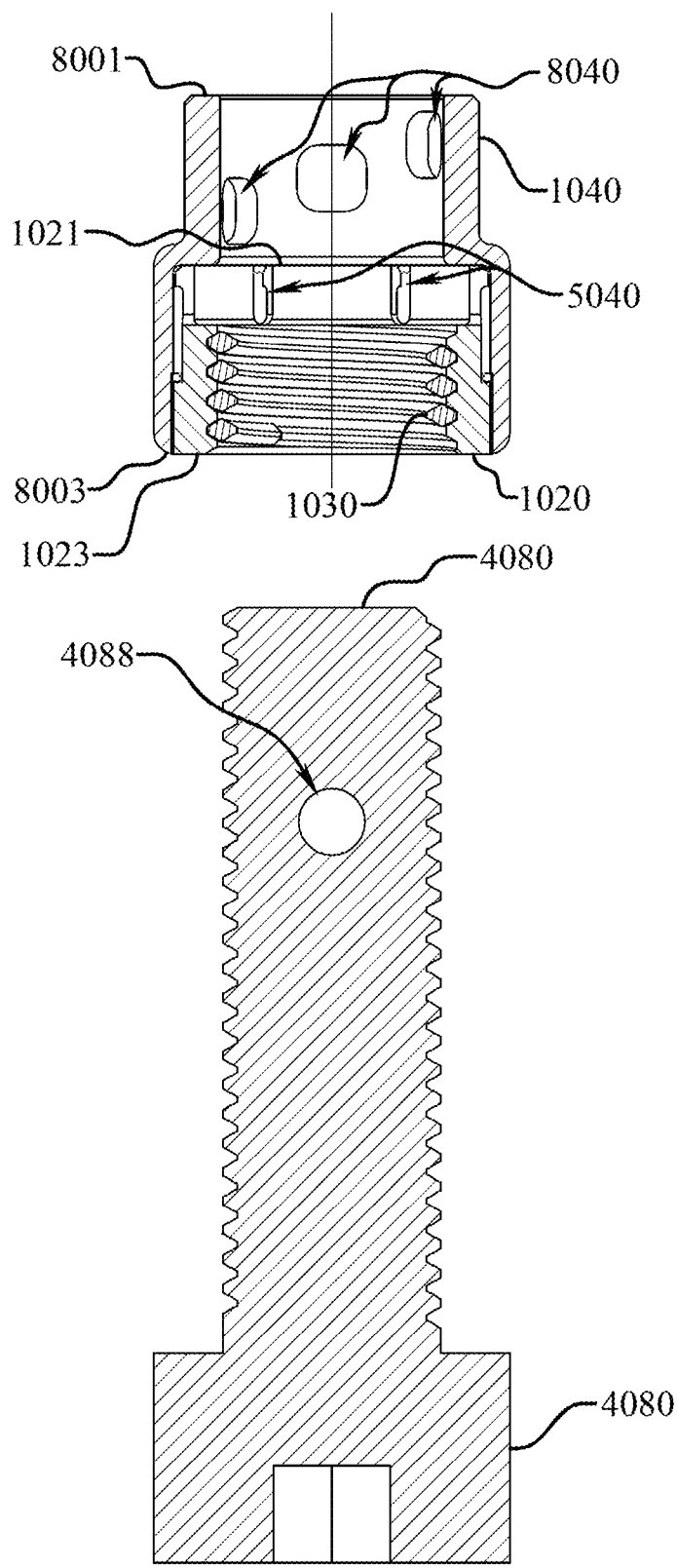
FIG. 19 shows a cross-sectional assembly view of a fastener.
Figure 20:
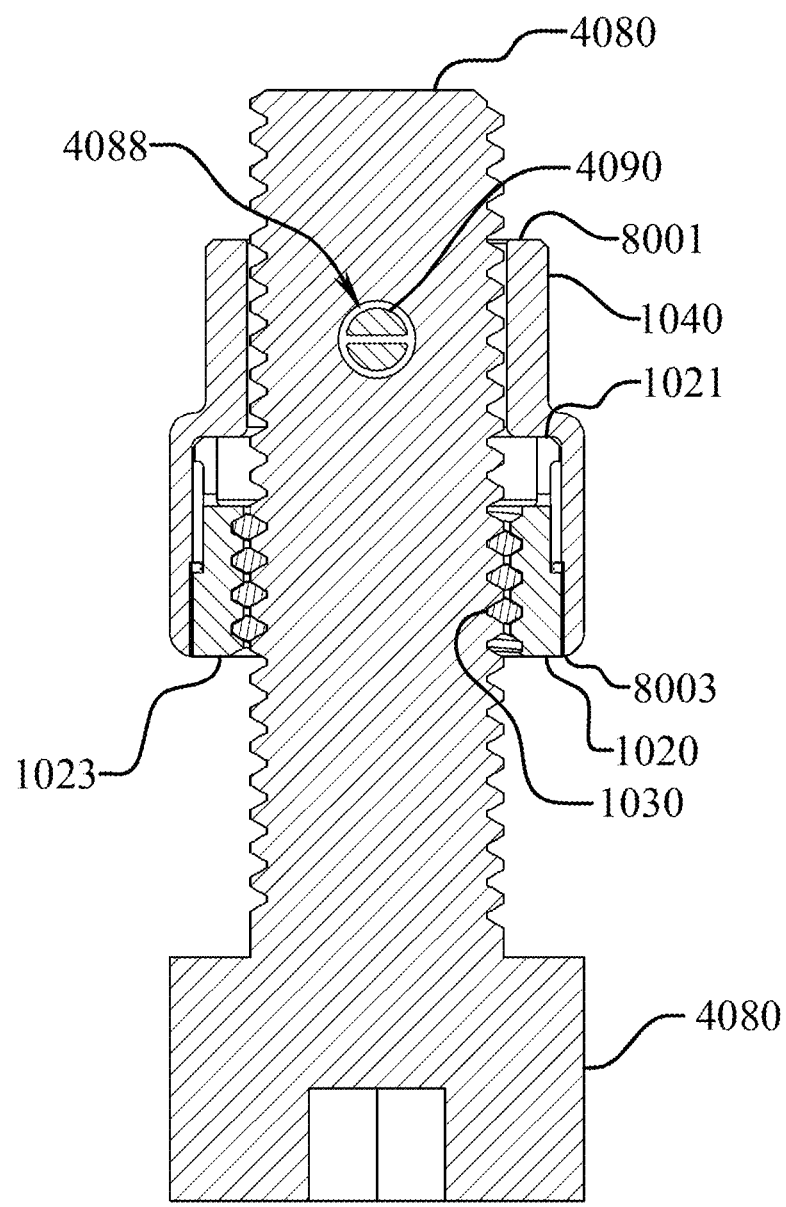
FIG. 20 shows a cross-sectional assembly view of a fastener.

The plurality of nut slots 5040 provide a mechanism to rotationally lock the nut 1020 to the nut cap 1040 when the two are engaged in a predetermined longitudinal position with respect to one another, or when the nut 1020 is used without a nut cap 1040 the nut slots 5040 may receive a portion of the pin 4090 to mechanically secure the nut 1020 to the shaft 4080 in a manner similar to the embodiment of FIG. 5A. In the former such embodiments, the nut cap bore 8030 may include nut cap projections 8060, such as those seen in FIG. 18, to cooperate with at least one of the nut slots 5040. Alternatively, or in addition to the nut slots 5040, the mechanism to rotationally lock the nut 1020 to the nut cap 1040 may include a plurality of nut locking serrations 1025 on the exterior surface of the nut 1020, which may be configured in a single perimeter ring extending from the nut proximal end 1023, as seen in FIG. 17, or a plurality of spaced apart rings, as seen in FIG. 1B. As previously disclosed, such nut locking serrations 1025 are configured to cooperate with a plurality of cap serrations 8050 on the interior surface of the nut cap 1040, which likewise may be configured as a single ring extending from the nut cap proximal end 8003, as seen in FIG. 18, or a plurality of spaced apart rings, as seen in FIG. 6B. In one embodiment the plurality of nut locking serrations 1025 includes at least 16 individual serrations spaced about the perimeter, and at least 20, 24, 28, 32, 36, and 40 in further embodiments. In a further embodiment the plurality of nut locking serrations 1025 includes no more than 72 individual serrations spaced about the perimeter, and no more 68, 64, 60, 56, and 52 in further embodiments. Similarly, in another embodiment the plurality of cap serrations 8050 includes at least 16 individual serrations spaced about the perimeter, and at least 20, 24, 28, 32, 36, and 40 in further embodiments. In a further embodiment the plurality of cap serrations 8050 includes no more than 72 individual serrations spaced about the perimeter, and no more 68, 64, 60, 56, and 52 in further embodiments. In another embodiment the greatest radial dimension from a peak to a valley of the nut locking serrations 1025, and/or the cap serrations 8050, is 1.50 mm, and 1.25 mm, 1.00 mm, 0.75 mm, and 0.50 mm in further embodiments. Further, the peak to peak separation distance between adjacent nut locking serrations 1025, and/or the cap serrations 8050, is no more than 5.0 mm, and no more than 4.0 mm, 3.0 mm, 2.0 mm, and 1.0 mm in further embodiments. In still another embodiment the greatest radial dimension from a peak to a valley of the nut locking serrations 1025, and/or the cap serrations 8050, is less than the peak to peak separation distance between adjacent nut locking serrations 1025, and/or the cap serrations 8050.

The nut slot depth 5041 is preferably at least 10% of the nut length 1027, and at least 15%, and 20% in further embodiments. However, additional embodiments limit the nut slot depth 5041 to balance the tradeoffs of rotational resistance strength, weight savings, durability, fatigue resistance, and longitudinal load bearing capability, by limiting the nut slot depth 5041 to no more than 60% of the nut length, and no more than 50%, 40%, and 30% in further embodiments. Further embodiments recognize desirable and unique performance, while balancing the mentioned tradeoffs, by having the nut slot width 5042 less than the nut slot depth 5041, and at least 10% less, 20% less, and 30% less in further embodiments. Similarly, a longitudinal length of the threaded portion of the nut bore 1028 is greater than the nut slot depth 5041, and is at least 20% greater, and at least 40% greater in further embodiments.

The portion of the nut 1020 between the nut slots 5040 create a plurality of nut tab extensions 5030, as seen in FIGS. 15, 17, and 5B. Each nut tab extension 5030 has a tab length 5031, seen in FIG. 15, and a nut tab sidewall thickness 8036. Again, balancing the aforementioned tradeoffs, desirable and unique performance is found when the tab length 5031 is greater than the nut slot depth 5041, and at least 20% greater, 40% greater, and 60% greater in further embodiments. In a further embodiment desirable benefits are achieved with the tab wall thickness 8036 is less than a maximum nut sidewall thickness 8038, and at least 10% less, 25% less, and 40% less in further embodiments; however, additional embodiments further balance the tradeoffs by limiting the relationship so that the tab wall thickness 8036 is no more than 80% less than the maximum nut sidewall thickness 8038, and no more than 70% less, and 60% less in further embodiments. Further, the tab wall thickness 8036 may vary to provide additional rigidity and a contact surface near the nut distal end 1021 that may also engage an inner surface of the nut cap 1040. Thus, in one embodiment the nut tab extension 5030 has a portion nearer the nut proximal end 1023 with a tab sidewall thickness 8036 that is less than the tab sidewall thickness 8036 at a point hearer the nut distal end 1021, such as that seen in FIG. 15.

Figure 16:
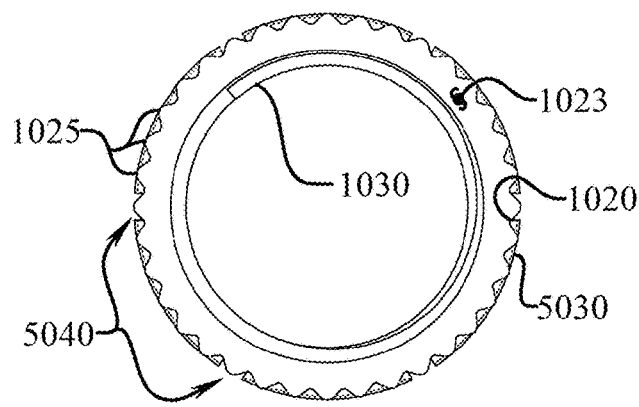
FIG. 16 shows a bottom plan view of a nut.
Figure 22:
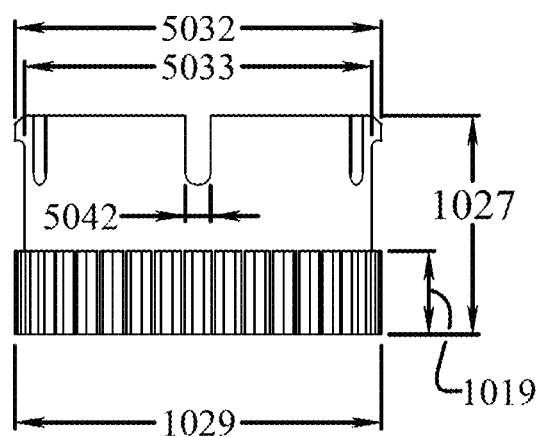
FIG. 22 shows a side elevation view of a nut.

As seen in the bottom plan view of FIG. 16, in one embodiment the outermost surface of the plurality of serrations do not extend beyond an outermost surface of the nut tab extensions 5030. Thus, in the illustrated round embodiment, with reference to FIG. 22, a maximum tab portion dimension 5032 is at least 2% greater than a minimum tab portion dimension 5033, and at least 3.5% greater, and at least 5% greater in further embodiments. Further, in another embodiment, a maximum serrated portion dimension 1029 is no greater than the maximum tab portion dimension 5032, however the maximum serrated portion dimension 1029 is greater than the minimum tab portion dimension 5033, and at least 2% greater, 3.5% greater, and 5% greater in additional embodiments. Additionally, a serrated portion length 1019, seen in FIG. 22, is no more than 80% of the nut length 1027, and no more than 60%, and no more than 40% in further embodiments; however, in further embodiments the serrated portion length 1019 is at least 10% of the nut length 1027, and at least 20%, and 30% in additional embodiments. Further, the sum of the serrated portion length 1019 and the nut slot depth 5041 are no more than 80% of the nut length 1027, and no more than 70%, and no more than 60% in further embodiments. Additionally, in another embodiment the serrated portion length 1019 is no more than 50% greater than the nut slot depth 5041. Incorporation of the plurality of nut slots 5040 at one end of the nut 1020, and the plurality nut locking serrations 8032 at the other end of the nut 1020, provides better durability, fatigue resistance, stress distribution, and a failsafe mechanism at the rotational locking interface between the nut 1020 and the nut cap 1040. Similarly, in another embodiment the nut slot width 5042 is no more than twice the separation distance between adjacent nut locking serrations 8032, and is no more than 70% greater than the separation distance between adjacent nut locking serrations 8032, and no more than 50% greater in still further embodiments.

Figure 21:
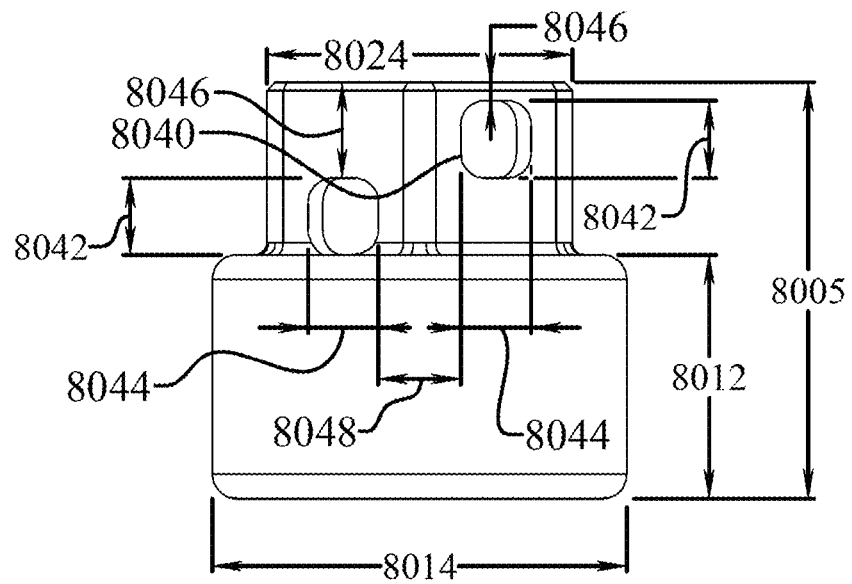
FIG. 21 shows a side elevation view of a nut cap.

Now focusing on the nut cap 1040 embodiments of FIGS. 18 and 21, the nut cap 1040 has a nut cap proximal end 8003 and a nut cap distal end 8001, thereby defining a nut cap length 8005. As seen in FIG. 21, the nut cap 1040 has a nut engagement portion 8010, having a nut engagement portion length 8012 and a nut engagement portion width 8014, and a positive locking portion 8020, having a positive locking portion length 8022 and a positive locking portion width 8024. The nut cap 1040 has a nut cap bore 8030 extending into the nut cap 1040 from the nut cap proximal end 8003, and in some embodiments extending all the way through the nut cap 1040 to the nut cap distal end 8001. The nut cap bore 8030 has a nut cap bore width 8032, which may be a diameter in the case of a round nut cap bore 8030. The nut cap distal end 8001 may be open to allow the shaft 4090 to pass all the way through the nut cap 1040, as illustrated, or it may be closed.

A portion of the nut cap bore 8030, within the nut engagement portion 8010, includes a rotation prevention structure that engages the nut 1020 to prevent rotation when engaged, but allows for rotational movement when disengaged by longitudinal movement of the nut 1020 and nut cap 1040. The rotation prevention structure may include a plurality of cap serrations 8050 and/or at least one nut cap projection 8060, as previously mentioned with respect to FIG. 18. The plurality of cap serrations 8050 have a cap serration length 8052, and the nut cap projection 8060 has a nut cap projection length 8062. In one embodiment the cap serration length 8052 is at least 10% of the nut engagement portion length 8012, and at least 20%, and at least 30% in further embodiments. Similarly, in another embodiment the cap serration length 8052 is at least 5% of the nut cap length 8005, and at least 10%, and at least 15% in further embodiments. Additionally, another series of embodiments limits the cap serration length 8052 so as to not require complete separation of the nut 1020 and nut cap 1040 in order to rotationally reposition them with respect to one another, as previously explained in the disclosure of the cap retainer 1050. Thus, in one embodiment the cap serration length 8052 is no more than 80% of the nut engagement portion length 8012, and no more than 65%, and no more than 50% in further embodiments. Similarly, in another embodiment the cap serration length 8052 is no more than 60% of the nut cap length 8005, and no more than 50%, and no more than 40% in further embodiments.

Figure 23:
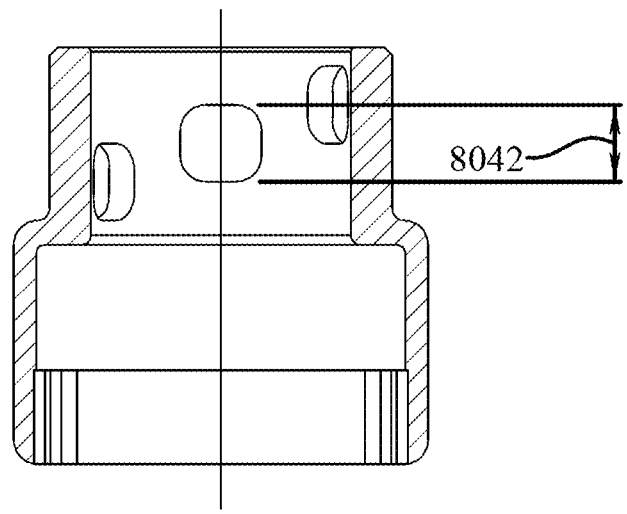
FIG. 23 shows a cross-sectional view of a nut cap.
Figure 24:
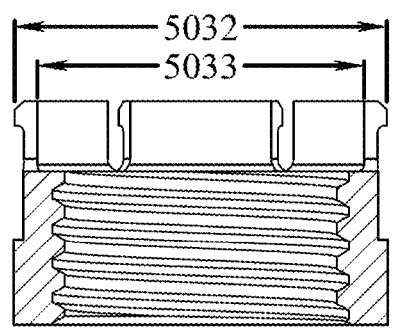
FIG. 24 shows a cross-sectional view of a nut.

With reference to FIGS. 18 and 21, the positive locking portion 8020 may be formed with a plurality of locking apertures 8040, as opposed to, or in addition to, the previously disclosed slots 1044, 4040 seen in FIGS. 1-7. In fact, all of the disclosure related to the slots 1044, 4040 applies equally to the locking apertures 8040. Each locking aperture 8040 has an aperture length 8042 and an aperture width 8044, seen in FIG. 21, which may be equal. Further, each locking aperture 8040 is located an aperture offset 8046 that is the distance, parallel to a longitudinal axis of the nut cap bore 8030, from the nut cap distal end 8001 to the nearest point of the locking aperture 8040, as seen in FIG. 23. Each locking aperture 8040 is separated from the adjacent locking aperture 8040 by an aperture separation distance 8048, shown in FIG. 21. The aperture separation distance 8048 is at least 50% of the aperture width 8044, and in further embodiments the aperture separation distance 8048 is at least 70% of the aperture width 8044, 90%, 100%, and 110%. In a further embodiment the aperture separation distance 8048 is at least 50% of the aperture length 8042, and in further embodiments the aperture separation distance 8048 is at least 70% of the aperture length 8042, 90%, 100%, and 110%. In another embodiment the aperture separation distance 8048 is at least 5% of the nut engagement portion width 8014, and at least 10%, 15%, and 25% in additional embodiments. Similarly, in another embodiment the aperture separation distance 8048 is at least 10% of the positive locking portion width 8024, and at least 15%, 20%, and 25% in additional embodiments.

One embodiment includes at least two pairs of locking apertures 8040. Within each pair the locking apertures 8040 are located 180 degrees from one another and each locking aperture 8040 within the pair has the same aperture offset 8046. However, each pair has a different aperture offset 8046. Thus, a first pair has a first aperture offset and the second pair has a second aperture offset that is greater than the first aperture offset. In one embodiment the second aperture offset is at least 15% greater than the first aperture offset, and at least 20%, 25%, 30%, 40%, 50%, 60%, and 70% greater in additional embodiments. In another series of embodiments the second aperture offset is no more than 400% greater than the first aperture offset, and no more than 300%, 250%, 200%, 150%, 100%, and 80% greater in additional embodiments. In another embodiment the first pair is radially offset no more than 90 degrees from the second pair, and in a further embodiment the first pair is radially offset no more than 60 degrees from the second pair, and in yet another embodiment the first pair is radially offset no more than 45 degrees from the second pair.

Another embodiment further includes a third pair of locking apertures, having a third aperture offset that is greater than the second aperture offset. In one embodiment the third aperture offset is at least 15% greater than the second aperture offset, and at least 20%, 25%, 30%, 40%, 50%, 60%, and 70% greater in additional embodiments. In another series of embodiments the third aperture offset is no more than 400% greater than the second aperture offset, and no more than 300%, 250%, 200%, 150%, 100%, and 80% greater in additional embodiments. In another embodiment the second pair is radially offset no more than 90 degrees from the third pair, and in a further embodiment the second pair is radially offset no more than 60 degrees from the third pair, and in yet another embodiment the second pair is radially offset no more than 45 degrees from the third pair. Further embodiments include at least four pair of locking apertures 8040, and five pair, and six pair in additional embodiments.

As one skilled in the art will appreciate, the aperture offset 8046 disclosure applies equally to embodiments containing slots rather than apertures. This is illustrated for convenience in FIG. 26 with respect to the embodiment of FIG. 6B but applies to all disclosed embodiments. Such slot embodiments have a slot bottom offset 8047, seen in FIG. 26, rather than an aperture offset 8046, and the slot bottom offset 8047 value is measured in the same manner as the aperture offset 8046 but to the deepest portion of the slot 1044; which also applies to slots 5040 formed in nuts such as embodiments like FIGS. 5A-5C. The disclosure of aperture length 8042, aperture width 8044, aperture offset 8046, aperture separation distance 8048, and aperture pairs, and all the associated relationships, applies equally to the slots.

In some embodiments the aperture length 8042 is not equal to the aperture width 8044. In further embodiments the aperture length 8042 is greater than the aperture width 8044, and at least 10%, 20%, and 30% greater in further embodiments. Additional embodiments cap this relationship to provide additional fail safes and in such embodiments the aperture length 8042 is no more than 70% greater than the aperture width 8044, and no more than 60%, 50%, and 40% in further embodiments. In still another embodiment the aperture length 8042 is no more than 80% of the positive locking portion length 8022, and in further embodiments the aperture length 8042 is no more than 70% of the positive locking portion length 8022, 60%, and 50%. Similarly, in further embodiments the aperture length 8042 is no more than 40% of the nut cap length 8005, and in further embodiments the aperture length 8042 is no more than 30% of the nut cap length 8005, 25%, and 20%. These same relationships of the aperture length 8042 to the positive locking portion length 8022 and the nut cap length 8005 apply equally to relationships of the aperture width 8044 to the positive locking portion length 8022 and the nut cap length 8005.

The nut cap length 8005 may be at least 25% greater than the nut length 1027, and at least 35%, 45%, 55%, 65%, and 75% greater in further embodiments. An additional series of embodiments limits this relationship such that the nut cap length 8005 is no more than 200% greater than the nut length 1027, and no more than 175%, 150%, and 125% greater in further embodiments. In another embodiment the nut engagement portion length 8012 is greater than the positive locking portion length 8022, and in another embodiment the nut engagement portion length 8012 is at least 5% greater than the positive locking portion length 8022, and 10%, 15%, and 20% greater in further embodiments.

With reference now to FIG. 21, while the positive locking portion width 8024 may be equal to, or even greater than, the nut engagement portion width 8014, in one embodiment, as illustrated, the positive locking portion width 8024 is less than the nut engagement portion width 8014. In fact, in one embodiment at least a portion of the positive locking portion 8020 has a positive locking portion width 8024 is at least 2.5% less than the nut engagement portion width 8014, and at least 5%, 7.5%, 10%, and 15% less in additional embodiments. Such embodiments facilitate the use of a compact pin 4090 that when installed and positioned in a locked position, such as that shown in FIG. 25, the pin 4090 does not extend beyond the widest portion of the locking cap 1040. Thus, in one embodiment at least a portion of the nut engagement portion 8010 has a nut engagement portion width 8014 that is greater than a greatest parallel dimension between the outermost points on pin 4090, thereby reducing the likelihood of the pin 4090 becoming a snag nuisance. Further, in the illustrated embodiment of FIGS. 18 and 21 the nut cap bore width 8032 is greater than the positive locking portion width 8024 of at least a portion of the positive locking portion 8020.

As with all of the disclosed relationships, they involve a delicate balance of tradeoffs that involves more than merely minimizing or maximizing a value, rather embodiments with closed ended ranges recognize points of diminishing returns and avoid negative consequences affecting durability, ease of use, strength, stress and stress distribution, fatigue and vibration resistance, and weight.

FIGS. 8A-8F illustrate the initial positioning of the nut 1020 and nut cap 1040 onto the shaft 4080. As seen in FIG. 8A the nut 1020 and nut cap 1040 may be independent and separable, however further embodiments may join the nut 1020 and nut cap 1040 together, while still allowing a predetermined amount of longitudinal movement to facilitate an engaged position and a disengaged position, as previously disclosed with respect to a cap retainer 1050, which one skilled in the art will recognize may be included in the embodiments of FIGS. 8A-26. Thus, the system may include individual components that are assembled together as seen in FIGS. 8A-8B, or the nut 1020 and nut cap 1040 may be previously joined together, such as the position of FIG. 8C, via a cap retainer 1050. Regardless, the following disclosure applies to all embodiments. Thus, with reference again to FIG. 8A, the nut cap 1040 is aligned with the nut 1020, and they are longitudinally positioned with respect to on another as shown in FIGS. 8B-8D so they are rotationally engaged and must rotate as a single unit. The assembly is then threaded onto the shaft 4090 as seen in FIGS. 8E and 8F. Obviously the external component that is to be fastened is not illustrated.

Figure 25:
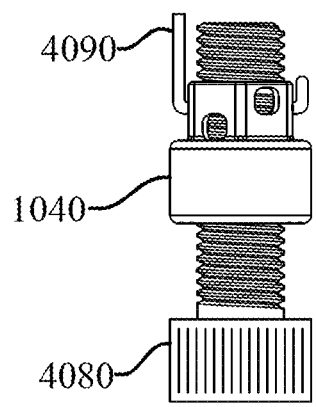
FIG. 25 shows a side elevation view of a fastener.
Figure 26:
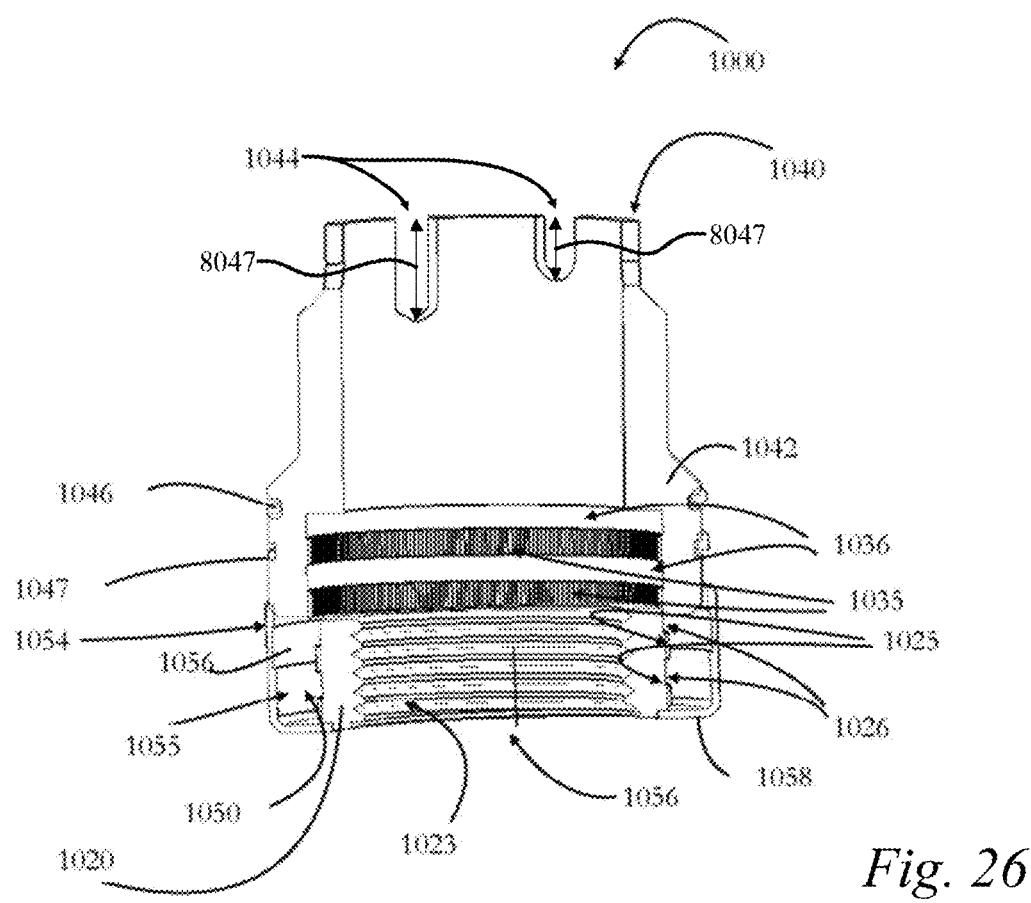
FIG. 26 shows a cross-sectional view of a fastener.

Once the nut 1020 is positioned on the shaft 4080 as desired, and/or the desired torque is reached, then the positive locking feature of the nut cap 1040 must be aligned with the cross bore 4088. Thus, FIGS. 8D-8F, 10B, 10C, and 20 show the nut 1020 and nut cap 1040 in the engaged position whereby the rotationally locking features are fully engaged and the nut 1020 and nut cap 1040 must rotate in unison. FIG. 9A shows the movement of the nut cap 1040 in an opposite longitudinal direction away from the fixed nut 1020 to a disengaged position whereby the nut cap 1040 can rotate independent of the nut 1020. FIG. 9B shows the nut cap 1040 rotated to an aligned position whereby at least one pair of locking apertures 8040, or slots 1044, 5040, are aligned with the cross bore 4088. Then, as shown in FIG. 9C, the nut cap 1040 is moved longitudinally in the opposite direction from the aligned position to the engaged and aligned position, shown in FIG. 9D, whereby the cross bore 4088 is not only radially aligned with the pair of apertures 8040, or slots, but also longitudinally aligned with the pair of apertures 8040, or slots, so that the pin 4090 may pass through one aperture 8040, or slot, then through the shaft 4080 via the cross bore 4088, and then through the second aperture 8040, or slot, thereby locking the nut cap 1040, and thus the nut 1020, in the engaged and aligned position relative to the shaft 4080. The flexibility provided by the different aperture offset 8046, or slot bottom offset 8047, or at least two pair of locking apertures 8040, or slots 1044, 5040, and all the associated length, width, radial, longitudinal, and separation distance relationships, increases the likelihood of the installer utilizing a position that maximizes the engagement between the nut cap 1040 and the nut 1020, and being afforded all the performance benefits of reliability, strength, reusability, and vibration and fatigue resistance, while also greatly simplifying the ease of use and labor savings, which are key goals of the present invention. If not obvious, FIGS. 9E and 9F simply illustrate the configuration of FIG. 9D rotated 90 degrees to illustrate the installation of the pin 4090. As shown in FIG. 9F and 25, in some embodiments one end, or both ends, of the pin 4090 may be bent to secure the pin 4090 in position.

The desired key goals are provided by a delicate interplay of relationships of the various components, variables within each component as well as relationships across the components. The disclosed relationships are more than mere optimization, maximization, or minimization of a single characteristic or variable, and are often contrary to conventional design thinking, yet have been found to achieve a unique balance of the trade-offs associated with competing criteria such as durability, vibration and fatigue resistance, weight, and ease of use. It is important to recognize that all the associated disclosure and relationships apply equally to all embodiments and should not be interpreted as being limited to the particular embodiment being discussed when a relationship is mentioned. Further, the aforementioned balances require trade-offs among the competing characteristics recognizing key points of diminishing returns, as often disclosed with respect to open and closed ranges for particular variables and relationships. Proper functioning of each component, and the overall system, on each and every engagement can be a matter of life or death. Therefore, this disclosure contains a unique combination of components and relationships that produce reliable joining and separation of components, and constrained freedom of movement of the components. While the relationships of the various features and dimensions of a single component play an essential role in achieving the goals, the relationships of features across multiple components are just as critical, if not more critical, to achieving the goals.

Additionally, the relative length, width, thickness, geometry, and material properties of various components, and their relationships to one another and the other design variables disclosed herein, influence the durability, ease of use, security, and safety of the system to achieve the goals. Now to put the disclosed ranges and relationships into perspective with an embodiment of nut cap 1040 has a nut cap length 8005 of 0.375"-0.750", and 0.400"-0.600" in another embodiment, and 0.450"-0.550" in still a further embodiment. The positive locking portion length 8022 is 0.150"-0.500" in an embodiment, and 0.175"-0.400" in another embodiment, and 0.200"-0.300" in still a further embodiment. The positive locking portion width 8024 is 0.250"-0.750" in an embodiment, and 0.300"-0.650" in another embodiment, and 0.325"-0.550" in still a further embodiment. With reference now to FIG. 18, an average locking portion sidewall thickness 8026 of the positive locking portion 8020 is 0.5-2.5 mm, and 0.7-2.0 mm in another embodiment, and 1.0-1.7 mm in still a further embodiment. The average engagement portion sidewall thickness 8016 of the nut engagement portion 8010 is 0.3-2.0 mm, and 0.4-1.5 mm in another embodiment, and 0.5-1.0 mm in still a further embodiment. Further, the nut length 1027 is 0.150"-0.500" in one embodiment, and 0.200"-0.400" in another embodiment, and 0.250"-0.350" in still a further embodiment. In another embodiment, the threaded portion of the nut 1020 is at least 40% of the nut length 1027, and at least 50%, 60%, and 70% in further embodiments.

Additionally, the nut slot depth 5041 is 0.050"-0.200" in an embodiment, 0.070"-0.150" in another embodiment, and 0.085"-0.125" in still a further embodiment. In additional embodiments the nut cap bore width 8032, the maximum tab portion dimension 5032, and/or the maximum serrated portion dimension 1029 is 0.250"-0.750", and 0.350"-0.650" in another embodiment, and 0.400"-0.550" in still another embodiment. The nut sidewall thickness 8038 is 0.5-2.5 mm, and 0.7-2.0 mm in another embodiment, and 1.0-1.7 mm in still a further embodiment. The tab wall thickness 8036 is 0.3-2.0 mm, and 0.4-1.5 mm in another embodiment, and 0.5-1.0 mm in still a further embodiment. In another embodiment the tab wall thickness 8036 varies such that a maximum tab wall thickness 8036 is at least 25% greater than a minimum tab wall thickness 8036, as seen in FIG. 15, and at least 30%, and 35% in further embodiments; while in a further series of embodiments the maximum tab wall thickness 8036 is no more than 150% greater than a minimum tab wall thickness 8036, and no more than 125%, 100%, and 75% in further embodiments. In one embodiment the nut length 9000 is less than 0.65", and 0.55", 0.45", and 0.35" in further embodiments. In a further embodiment the nut has less than 60 threads per inch.

In addition to the previously disclosed hardness relationships, in another embodiment the helical coil insert 1030 has a density greater than the density of the nut 1020, the nut cap 1040, and/or the shaft 4080. In fact, in another embodiment the helical coil insert 1030 has a density that is at least twice the density of the nut 1020, the nut cap 1040, and/or the shaft 4080.

In a further embodiment at least one of the nut 1020, nut cap 1040, shaft 4080, and pin 4090 are composed of, but not limited to, at least one of the following: an aluminum alloy, an anodized aluminum alloy, a copper containing alloy, a zinc alloy, a stainless steel alloy, a carbon steel alloy, a carbon epoxy compound, or a glass epoxy compound. Additionally, in the embodiments that are composed of various metals a corrosion resisting coating may also be used such as, but not limited to: a cadmium coating, a chromate coating, a polymer coating or a combination thereof. Furthermore, in one embodiment any of the threaded surfaces may have a lubricant to help facilitate ease of installing, including dry film lubricants such as molybdenum disulfide. Further, any of the components may include corrosion resistant coatings and/or cadmium plating.

Some examples of metal alloys that can be used to form any of the components include, without limitation, magnesium alloys, aluminum/aluminum alloys (e.g., 3000 series alloys, 5000 series alloys, 6000 series alloys, such as 6061-T6, and 7000 series alloys, such as 7075, just to name a few), titanium alloys (e.g., 3-2.5, 6-4, SP700, 15-3-3-3, 10-2-3, and other alpha/near alpha, alpha-beta, and beta/near beta titanium alloys, just to name a few), carbon steels (e.g., 1020 and 8620 carbon steel, just to name a few), stainless steels (e.g., A286, 301, 302, 303, 304, 309, 316 and 410 stainless steel), PH (precipitation-hardenable) alloys (e.g., 17-4, C450, and C455 alloys, just to name a few), copper alloys, brass alloys, bronze alloys, nickel alloys, austenitic nickel-chromium-based superalloys such as Inconel, a registered trademark of Special Metals Corporation, high-temperature low creep superalloys such as Nimonic 90, is a registered trademark of Special Metals Corporation, and iron-base superalloys such as heat and corrosion resistant austenitic iron-base material Type A286 alloy (S66286).

Additionally, in some embodiments the nut 1020, nut cap 1040, shaft 4080, and/or pin 4090 may be formed of nonmetallic materials such as plastics, composites, thermoplastics, and resin based composites. In one embodiment the nonmetallic material is a carbon fiber reinforced plastic material. Another embodiment the nonmetallic material is a polyamide resin, while in a further embodiment the polyamide resin includes fiber reinforcement, and in yet another embodiment the polyamide resin includes at least 35% fiber reinforcement. In one such embodiment the fiber reinforcement includes long-glass fibers having a length of at least 10 millimeters pre-molding and produce a finished component having fiber lengths of at least 3 millimeters, while another embodiment includes fiber reinforcement having short-glass fibers with a length of at least 0.5-2.0 millimeters pre-molding. Incorporation of the fiber reinforcement increases the tensile strength of the component, however it may also reduce the primary portion elongation to break therefore a careful balance must be struck to maintain sufficient elongation. Therefore, one embodiment includes 35-55% long fiber reinforcement, while in an even further embodiment has 40-50% long fiber reinforcement. One specific example is a long-glass fiber reinforced polyamide 66 compound with 40% carbon fiber reinforcement, such as the XuanWu W5801 resin having a tensile strength of 245 megapascal and 7% elongation at break. Long fiber reinforced polyamides, and the resulting melt properties, produce a more isotropic material than that of short fiber reinforced polyamides, primarily due to the three-dimensional network formed by the long fibers developed during injection molding. Another advantage of long-fiber material is the almost linear behavior through to fracture resulting in less deformation at higher stresses.

In a still further embodiment the nut 1020, nut cap 1040, shaft 4080, and/or pin 4090 may be formed of a nonmetallic material having a density of less than 2 g/cc and an elongation to break of at least 3% in one embodiment, and at least 4%, 5%, 6%, 7%, and 8% in further embodiments. In a further embodiment the nonmetallic material has a density of less than 1.80 g/cc, and less than 1.60 g/cc, and less than 1.40 g/cc, and less than 1.2 g/cc in additional embodiments. In an embodiment the nonmetallic material is a thermoplastic material, and a Polyetherimide (PEI) in a further embodiment, and, in still more embodiments, any of the following materials that meet the claimed mechanical properties: polycaprolactam, a polyhexamethylene adipinamide, or a copolymer of hexamethylene diamine adipic acid and caprolactam, however other embodiments may include polypropylene (PP), nylon 6 (polyamide 6), polybutylene terephthalates (PBT), thermoplastic polyurethane (TPU), PC/ABS alloy, PPS, PEEK, and semi-crystalline engineering resin systems that meet the claimed mechanical properties. In one embodiment the nonmetallic material has one, or more, of the following properties: a tensile strength of at least 20 Ksi, a tensile modulus of at least 1000 Ksi, a flexural strength of at least 30 Ksi, a flexural modulus of at least 900 Ksi, a compressive strength of at least 20 Ksi, a compressive modulus of at least 450 Ksi, a shear strength of at least 13 Ksi, and a Rockwell M scale hardness of at least 105.

In still another embodiment at least one of the nut 1020 and nut cap 1040 are formed of a metallic material with a density of less than 4.6 g/cc in one embodiment, and less than 3 g/cc in yet another embodiment: and in another embodiment the material has one, or more, of the following properties: an ultimate tensile strength of at least 68 Ksi, and at least 80 Ksi in anther embodiment; a tensile yield strength of at least 47 Ksi, and at least 70 Ksi in another embodiment; an elongation to break of at least 9% in one embodiment, and at least 11% in another embodiment, and at least 13%, 15%, 17%, and 19% in still further embodiments; and/or a modulus of elasticity of at least 9000 Ksi in one embodiment, and at least 10000 Ksi in another embodiment.

Another embodiment tunes the galvanic compatibility of the components. Thus, in one embodiment there is no more than a 0.50 V difference in the "Anodic Index" between any two of the components that come in contact with one another, while in another embodiment there is no more than a 0.25 V difference in the "Anodic Index" between any two of the components that come in contact with one another, and in yet another embodiment there is no more than a 0.15 V difference in the "Anodic Index" between any two of the components that come in contact with one another; per the galvanic data from MIL-STD-889.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. Additional benefits and features of the fastener system will be apparent to those skilled in the art.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above system without departing from the scope of the invention herein involved, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

I claim:

1. A torque control fastener system, comprising:
a fastener nut having a nut proximal end and a nut distal end, a nut bore extending from the nut proximal end into the fastener nut and defining a nut bore axis, a plurality of nut bore threads on at least a portion of the nut bore, and formed of a nut material having a nut Rockwell C hardness of no greater than 42 RWC and a nut coefficient of thermal expansion;
a helical wire insert formed to create a plurality of insert coils forming insert external threads and a plurality of insert internal threads, and formed of an insert material having an insert Rockwell C hardness of at least 43 RWC and an insert coefficient of thermal expansion greater than the nut coefficient of thermal expansion, wherein a portion of the insert external threads mate with a portion of the nut bore threads in a portion of the nut bore and engage the fastener nut;
a shaft having a plurality of shaft threads that mate with a portion of the insert internal threads such that an insertion torque is required to create relative movement between the shaft threads and the insert internal threads in a first direction, and a removal torque is required to create relative movement between the shaft threads and the insert internal threads in a second direction opposite the first direction;
wherein a hardness differential between the insert Rockwell C hardness and the nut Rockwell C hardness is 2-13.

2. The torque control fastener system of claim 1, wherein the insert coefficient of thermal expansion is at least $1.5 \times 10^{-6}$/° C. greater than the nut coefficient of thermal expansion, the nut Rockwell C hardness is no greater than 40 RWC, and the hardness differential is no greater than 10.

3. The torque control fastener system of claim 1, wherein the insert coefficient of thermal expansion is at least $3.0 \times 10^{-6}$/° C. greater than the nut coefficient of thermal expansion, the nut Rockwell C hardness is no greater than 38 RWC, and the hardness differential is no greater than 7.

4. The torque control fastener system of claim 3, wherein the insert coefficient of thermal expansion is no more than $9.0 \times 10^{-6}$/° C. greater than the nut coefficient of thermal expansion.

5. The torque control fastener system of claim 4, wherein the insert coefficient of thermal expansion is at least $13.0 \times 10^{-6}$/° C.

6. The torque control fastener system of claim 5, wherein majority of the plurality of insert coils are regular coils having a circular end profile, and at least one of the plurality of insert coils is a locking coil having a non-circular end profile including at least three straight segments, and the locking coil is located between regular coils.

7. The torque control fastener system of claim 6, wherein the helical wire insert has an insert distal end and an insert proximal end, a first quantity of regular coils are located between the insert distal end and the locking coil, a second quantity of regular coils are located between the insert proximal end and the locking coil, and the first quantity is different than the second quantity.

8. The torque control fastener system of claim 7, wherein the first quantity is at least 2 greater than the second quantity.

9. The torque control fastener system of claim 8, wherein the first quantity is 4-10 and the second quantity is 2-10.

10. The torque control fastener system of claim 8, wherein the locking coil is located a locking offset distance from the nut proximal end, and the locking offset distance is at least 60% of the nut length.

11. The torque control fastener system of claim 7, wherein the nut has a lock-free zone and no portion of the locking coil is within the lock-free zone, wherein the lock-free zone is defined by a predetermined lock-free distance measured parallel to a nut longitudinal axis from a transverse plane perpendicular to the nut longitudinal axis and passing through a midpoint of the nut length, and the lock-free zone extends the lock-free distance toward the nut proximal end and extends the lock-free distance toward the nut distal end, and the lock-free distance is at least 5% of the nut length.

12. The torque control fastener system of claim 11, wherein the nut has a second lock-free zone and no portion of the locking coil is within the second lock-free zone, wherein the second lock-free zone is defined by the predetermined lock-free distance measured parallel to a nut longitudinal axis from the nut distal end.

13. The torque control fastener system of claim 12, wherein the nut has a third lock-free zone and no portion of the locking coil is within the third lock-free zone, wherein the third lock-free zone is defined by the predetermined lock-free distance measured parallel to a nut longitudinal axis from the nut proximal end.

14. The torque control fastener system of claim 12, wherein the predetermined lock-free distance is no more than 30% of the nut length.

15. The torque control fastener system of claim 14, wherein the nut includes a tool-engagement portion and a load bearing portion, separated by a transition portion, and no portion of the locking coil is located in the transition portion.

16. The torque control fastener system of claim 15, wherein locking offset distance is 60-90% of the nut length.

17. The torque control fastener system of claim 14, wherein the nut material is aluminum alloy and the nut has a nut mass of less than 1.5 grams, and the insert material is stainless steel alloy and the insert has an insert mass of no more than 85% of the nut mass.

18. A torque control fastener system, comprising:
- a fastener nut having a nut proximal end and a nut distal end, a nut bore extending from the nut proximal end into the fastener nut and defining a nut bore axis, a plurality of nut bore threads on at least a portion of the nut bore, and formed of a nut material having a nut Rockwell C hardness of no greater than 40 RWC and a nut coefficient of thermal expansion;
- a helical wire insert formed to create a plurality of insert coils forming insert external threads and a plurality of insert internal threads, and formed of an insert material having an insert Rockwell C hardness of at least 43 RWC and an insert coefficient of thermal expansion greater than the nut coefficient of thermal expansion, wherein a portion of the insert external threads mate with a portion of the nut bore threads in a portion of the nut bore and engage the fastener nut, wherein majority of the plurality of insert coils are regular coils having a circular end profile, and at least one of the plurality of insert coils is a locking coil having a non-circular end profile including at least three straight segments, and the locking coil is located between regular coils, and wherein the helical wire insert has an insert distal end and an insert proximal end, a first quantity of regular coils are located between the insert distal end and the locking coil, a second quantity of regular coils are located between the insert proximal end and the locking coil, and the first quantity is different than the second quantity;
- a shaft having a plurality of shaft threads that mate with a portion of the insert internal threads such that an insertion torque is required to create relative movement between the shaft threads and the insert internal threads in a first direction, and a removal torque is required to create relative movement between the shaft threads and the insert internal threads in a second direction opposite the first direction;
- wherein a hardness differential between the insert Rockwell C hardness and the nut Rockwell C hardness is 2-10, and the insert coefficient of thermal expansion is at least $1.5 \times 10^{-6}/°$ C. greater than the nut coefficient of thermal expansion.

19. The torque control fastener system of claim 18, wherein the insert coefficient of thermal expansion is at least $3.0 \times 10^{-6}/°$ C. greater than the nut coefficient of thermal expansion, the nut Rockwell C hardness is no greater than 38 RWC, the hardness differential is no greater than 7, the insert coefficient of thermal expansion is no more than $9.0 \times 10^{-6}/°$ C. greater than the nut coefficient of thermal expansion, and the insert coefficient of thermal expansion is at least $13.0 \times 10^{-6}/°$ C.

20. The torque control fastener system of claim 18, wherein the first quantity is 4-10 and the second quantity is 2-10, and the nut has a lock-free zone and no portion of the locking coil is within the lock-free zone, wherein the lock-free zone is defined by a predetermined lock-free distance measured parallel to a nut longitudinal axis from a transverse plane perpendicular to the nut longitudinal axis and passing through a midpoint of the nut length, and the lock-free zone extends the lock-free distance toward the nut proximal end and extends the lock-free distance toward the nut distal end, and the lock-free distance is at least 5% of the nut length.

\* \* \* \* \*